United States Patent
Xu et al.

(10) Patent No.: US 11,146,370 B2
(45) Date of Patent: Oct. 12, 2021

(54) WIRELESS COMMUNICATION METHOD AND WIRELESS COMMUNICATIONS APPARATUS

(71) Applicant: Huawei Technologies Co., Ltd., Shenzhen (CN)

(72) Inventors: Minghui Xu, Chengdu (CN); Xi Zhang, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/580,759

(22) Filed: Sep. 24, 2019

(65) Prior Publication Data

US 2020/0021412 A1    Jan. 16, 2020

Related U.S. Application Data

(63) Continuation of application No. PCT/CN2018/080302, filed on Mar. 23, 2018.

(30) Foreign Application Priority Data

Mar. 24, 2017   (CN) .......................... 201710184785.6
Aug. 11, 2017   (CN) .......................... 201710685872.X

(51) Int. Cl.
*H04L 5/00*  (2006.01)
*H04L 1/00*  (2006.01)

(52) U.S. Cl.
CPC .......... *H04L 5/0048* (2013.01); *H04L 1/0003* (2013.01); *H04L 1/0009* (2013.01)

(58) Field of Classification Search
CPC ... H04L 1/0003; H04L 1/0027; H04L 1/0009; H04L 1/0021; H04L 27/261; H04L 5/0048; H04L 5/0094
See application file for complete search history.

(56) References Cited

U.S. PATENT DOCUMENTS

2015/0043520 A1   2/2015   Sun et al.
2015/0288483 A1   10/2015  Sun et al.
(Continued)

FOREIGN PATENT DOCUMENTS

CN   104125186 A   10/2014
CN   104980247 A   10/2015
(Continued)

OTHER PUBLICATIONS

"PT-RS design", R1-1702959, 3GPP TSG RAN WG1 #88, Athens, Greece, Feb. 2017, 6 pages (Year: 2017).*
(Continued)

*Primary Examiner* — Quoc Thai N Vu
(74) *Attorney, Agent, or Firm* — Leydig, Voit & Mayer, Ltd.

(57) ABSTRACT

A wireless communication method includes: sending first indication information to a network device, wherein the first indication information is used to indicate at least one of a modulation and coding scheme threshold that corresponds to a pattern of a phase tracking reference signal and recommended by a terminal device, a scheduled resource block quantity threshold that corresponds to the pattern of the phase tracking reference signal and recommended by the terminal device, and a factor of impact of phase noise of the terminal device on a signal received by the terminal device; and receiving the phase tracking reference signal sent by the network device.

20 Claims, 7 Drawing Sheets

(56) References Cited

U.S. PATENT DOCUMENTS

2016/0087774 A1    3/2016   Guo et al.
2018/0205528 A1*   7/2018   Bai ..................... H04L 5/0058

FOREIGN PATENT DOCUMENTS

CN        105122871 A      12/2015
WO        2013008404 A1     1/2013

OTHER PUBLICATIONS

"Reference signal design for phase noise compensation in HF," 3GPP TSG RAN WG1 Meeting #86bis, R1-1608822, Lisbon, Portugal, total 5 pages, 3rd Generation Partnership Project, Valbonne, France (Oct. 10-14, 2016).

"Reference signal design for phase tracking," 3GPP TSG RAN WG1 Meeting #87, R1-1611240, Reno, USA, total 5 pages, 3rd Generation Partnership Project, Valbonne, France (Nov. 14-18, 2016).

"Further details for PT-RS design," 3GPP TSG RAN WG1 Meeting Ad Hoc for NR, R1-1700073, Spokane, USA, total 5 pages, 3rd Generation Partnership Project, Valbonne, France (Jan. 16-20, 2017).

"Discussion on phase tracking RS design," 3GPP TSG RAN WG1 Meeting #88, R1-1702345, total 6 pages, 3rd Generation Partnership Project, Valbonne, France (Feb. 13-17, 2017).

"On the PTRS design for NR," 3GPP TSG RAN WG1 NR Ad-Hoc Meeting, R1-1701105, Total 16 pages, 3rd Generation Partnership Project, Valbonne, France (Jan. 16-20, 2017).

"Phase-Tracking Reference Signal Design for High-Frequency Systems," 3GPP TSG RAN WG1 Meeting #88, Athens, Greece, R1-1703406, XP051210534, pp. 1-11, 3rd Generation Partnership Project, Valbonne, France (Feb. 13-17, 2017).

"Phase and Frequency Tracking Reference Signal Considerations," 3GPP TSG-RAN WG1 #87, Reno, Nevada, USA, R1-1612054, XP051176015, pp. 1-4, 3rd Generation Partnership Project, Valbonne, France (Nov. 14-18, 2016).

"Further details for PT-RS design," 3GPP TSG RAN WG1 Meeting #88, Athens, Greece, R1-1701698, XP051208864, Total 4 pages, 3rd Generation Partnership Project, Valbonne, France (Feb. 13-17, 2017).

"Phase and frequency tracking reference signal considerations," 3GPP TSG-RAN WG1 #87AH, Spokane, USA, R1-1700808, XP051208327, pp. 1-7, 3rd Generation Partnership Project, Valbonne, France (Jan. 16-20, 2017).

"Verizon 5G TF; Air Interface Working Group; Verizon 5th Generation Radio Access; Physical channels and modulation (Release 1)," TS V5G.211 V1.7, Total 83 pages (Oct. 2016).

"Phase and frequency tracking reference signal considerations," 3GPP TSG-RAN WG1 #88, R1-1702617, Total 7 pages, 3rd Generation Partnership Project, Valbonne, France (Feb. 13-17, 2017).

* cited by examiner

WIRELESS COMMUNICATION METHOD AND WIRELESS COMMUNICATIONS APPARATUS

CROSS-REFERENCE TO RELATED APPLICATIONS

This application is a continuation of International Application No. PCT/CN2018/080302, filed on Mar. 23, 2018 which claims priority to Chinese Patent Application No. 201710184785.6, filed with the China National Intellectual Property Administration on Mar. 24, 2017 and entitled "WIRELESS COMMUNICATION METHOD, NETWORK DEVICE, AND TERMINAL DEVICE", and Chinese Patent Application No. 201710685872.X, filed with the China National Intellectual Property Administration on Aug. 11, 2017 and entitled "WIRELESS COMMUNICATION METHOD AND WIRELESS COMMUNICATIONS APPARATUS", all of which are incorporated herein by reference in their entireties.

TECHNICAL FIELD

This application relates to the communications field, and more specifically, to a wireless communication method and a wireless communications apparatus.

BACKGROUND

In an existing wireless communications network, fewer operating bands are available in a frequency range below 6 GHz, and consequently an ever-increasing communication requirement cannot be met. In a next generation wireless communications network (for example, 5G), an operating band of a communications system is above 6 GHz. Therefore, the next generation wireless communications network has notable features of a high-frequency communications system, and it is easy to implement a relatively high throughput. However, compared with the existing wireless communications network, the next generation wireless communications network that operates in a range above 6 GHz is subject to severer intermediate radio frequency distortion, especially impact of phase noise (PN). A higher phase noise level indicates greater impact of a common phase error (CPE).

In the prior art, a demodulation reference signal (DMRS) and a phase tracking reference signal (PTRS) (which may also be referred to as a phase compensation reference signal (PCRS)) are used to jointly implement channel estimation, phase noise estimation, and data demodulation. In the prior art, the PTRS is consecutive in time domain, and in frequency domain, corresponds to a plurality of ports for which a frequency division manner is used. Patterns of phase tracking reference signals of different terminal devices in a case of different modulation and coding schemes and/or different scheduled bandwidth are of a fixed configuration mode. In a case of high data bandwidth, a relatively large quantity of subcarriers are occupied, and resource overheads are relatively high. In addition, in different scenarios such as different phase noise levels or moving speeds, it is far from flexible due to a used design of a fixed time or frequency density.

Therefore, how to flexibly configure a PTRS to reduce a quantity of subcarriers occupied by the PTRS and reduce resource overheads is a problem to be urgently resolved.

SUMMARY

This application provides a wireless communication method, to flexibly configure patterns of phase tracking reference signals of different terminal devices in a case of different modulation and coding schemes and/or different scheduled bandwidth, so that overheads of the phase tracking reference signals are reduced and spectral efficiency is improved while phase noise error compensation performance is ensured.

According to a first aspect, a wireless communication method is provided, including: determining, by a network device, a pattern of a phase tracking reference signal based on at least one of a modulation and coding scheme threshold that corresponds to the pattern of the phase tracking reference signal and requested by a terminal device, a scheduled resource block quantity threshold corresponding to the phase tracking reference signal requested by the terminal device, and a factor of impact of phase noise of the terminal device on a signal received by the terminal device and at least one of a modulation and coding scheme currently scheduled by the network device for the terminal device and bandwidth currently scheduled by the network device for the terminal device; and sending the phase tracking reference signal to the terminal device based on the determined pattern of the phase tracking reference signal.

Therefore, the network device determines the pattern of the phase tracking reference signal based on the at least one of the modulation and coding scheme threshold that corresponds to the pattern of the phase tracking reference signal and requested by the terminal device, the scheduled resource block quantity threshold corresponding to the phase tracking reference signal requested by the terminal device, and the factor of the impact of the phase noise of the terminal device on the signal received by the terminal device and the at least one of the modulation and coding scheme currently scheduled by the network device for the terminal device and the bandwidth currently scheduled by the network device for the terminal device. In this way, patterns of phase tracking reference signals of different terminal devices in a case of different modulation and coding schemes and/or different scheduled bandwidth are flexibly configured, and therefore overheads of the phase tracking reference signals are reduced and spectral efficiency is improved while phase noise error compensation performance is ensured.

Optionally, in an implementation of the first aspect, before the determining, by a network device, a pattern of a phase tracking reference signal based on at least one of a modulation and coding scheme threshold that corresponds to the pattern of the phase tracking reference signal and requested by a terminal device, a scheduled resource block quantity threshold corresponding to the phase tracking reference signal requested by the terminal device, and a factor of impact of phase noise of the terminal device on a signal received by the terminal device and at least one of a modulation and coding scheme currently scheduled by the network device for the terminal device and bandwidth currently scheduled by the network device for the terminal device, the method further includes:

receiving, by the network device, the at least one of the modulation and coding scheme threshold that corresponds to the pattern of the phase tracking reference signal and requested by the terminal device, the scheduled resource block quantity threshold corresponding to the phase tracking reference signal requested by the terminal device, and the factor of the impact of the phase noise of the terminal device on the signal received by the terminal device that are sent by the terminal device.

Optionally, in an implementation of the first aspect, before the determining, by a network device, a pattern of a phase tracking reference signal based on at least one of a modulation and coding scheme threshold that corresponds to the pattern of the phase tracking reference signal and requested by a terminal device, a scheduled resource block quantity threshold corresponding to the phase tracking reference signal requested by the terminal device, and a factor of impact of phase noise of the terminal device on a signal received by the terminal device and at least one of a modulation and coding scheme currently scheduled by the network device for the terminal device and bandwidth currently scheduled by the network device for the terminal device, the method further includes:

receiving, by the network device, a number of a table of the modulation and coding scheme threshold corresponding to the pattern of the phase tracking reference signal and/or a number of a table of the scheduled resource block quantity threshold corresponding to the pattern of the phase tracking reference signal that are/is sent by the terminal device.

Optionally, in an implementation of the first aspect, before the determining, by a network device, a pattern of a phase tracking reference signal based on at least one of a modulation and coding scheme threshold that corresponds to the pattern of the phase tracking reference signal and requested by a terminal device, a scheduled resource block quantity threshold corresponding to the phase tracking reference signal requested by the terminal device, and a factor of impact of phase noise of the terminal device on a signal received by the terminal device and at least one of a modulation and coding scheme currently scheduled by the network device for the terminal device and bandwidth currently scheduled by the network device for the terminal device, the method further includes:

receiving, by the network device, a number of a parameter associated with the modulation and coding scheme threshold corresponding to the pattern of the phase tracking reference signal and/or a number of a parameter associated with the scheduled resource block quantity threshold corresponding to the pattern of the phase tracking reference signal that are/is sent by the terminal device; and determining, based on the number of the parameter associated with the modulation and coding scheme threshold corresponding to the pattern of the phase tracking reference signal and/or the number of the parameter associated with the scheduled resource block quantity threshold corresponding to the pattern of the phase tracking reference signal that are/is sent by the terminal device, the modulation and coding scheme threshold that corresponds to the pattern of the phase tracking reference signal and requested by the terminal device and the scheduled resource block quantity threshold corresponding to the phase tracking reference signal requested by the terminal device.

Optionally, in an implementation of the first aspect, the parameter associated with the modulation and coding scheme threshold corresponding to the pattern of the phase tracking reference signal, or the parameter associated with the modulation and coding scheme threshold corresponding to the pattern of the phase tracking reference signal, or both include at least one of the following parameters: a frequency, a phase noise model of the terminal device, a subcarrier spacing, and a phase noise processing capability of a receiver.

Optionally, in an implementation of the first aspect, the scheduled resource block quantity threshold corresponding to the phase tracking reference signal requested by the terminal device may be a bandwidth threshold corresponding to the phase tracking reference signal requested by the terminal device.

Optionally, in an implementation of the first aspect, the determining a pattern of a phase tracking reference signal includes:

determining a time domain density of the phase tracking reference signal based on the modulation and coding scheme threshold that corresponds to the pattern of the phase tracking reference signal and requested by the terminal device and the modulation and coding scheme currently scheduled by the network device for the terminal device.

Optionally, in an implementation of the first aspect, the determining a time domain density of the phase tracking reference signal based on the modulation and coding scheme threshold corresponding to the pattern of the phase tracking reference signal and the currently scheduled modulation and coding scheme includes: modifying, based on phase noise of the network device, the modulation and coding scheme threshold corresponding to the pattern of the phase tracking reference signal; and determining the time domain density of the phase tracking reference signal based on a modified modulation and coding scheme threshold corresponding to the pattern of the phase tracking reference signal and the modulation and coding scheme currently scheduled by the network device for the terminal device.

Therefore, the time domain density of the phase tracking reference signal is determined based on the modulation and coding scheme threshold corresponding to the pattern of the phase tracking reference signal and the currently scheduled modulation and coding scheme. In this way, the phase tracking reference signal can be flexibly configured in time domain, thereby reducing resource overheads, and improving spectral efficiency.

Optionally, in an implementation of the first aspect, before the sending the phase tracking reference signal to the terminal device based on the pattern of the phase tracking reference signal, the method further includes: when the network device modifies the modulation and coding scheme threshold corresponding to the pattern of the phase tracking reference signal, sending first indication information to the terminal device, where the first indication information is used to indicate the modified modulation and coding scheme threshold corresponding to the pattern of the phase tracking reference signal; or when the network device does not modify the modulation and coding scheme threshold corresponding to the pattern of the phase tracking reference signal, sending first indication information to the terminal device, where the first indication information is confirmation information.

Optionally, in an implementation of the first aspect, that the first indication information is used to indicate the modified modulation and coding scheme threshold corresponding to the pattern of the phase tracking reference signal, includes:

the first indication information is used to indicate, by using a difference between the modified modulation and coding scheme threshold corresponding to the pattern of the phase tracking reference signal and the modulation and coding scheme threshold that corresponds to the pattern of the phase tracking reference signal and requested by the terminal device, the modified modulation and coding scheme threshold corresponding to the pattern of the phase tracking reference signal.

Optionally, in an implementation of the first aspect, the first indication information is radio resource control signaling.

Optionally, in an implementation of the first aspect, the determining a pattern of a phase tracking reference signal includes:

determining a frequency domain density of the phase tracking reference signal based on the scheduled resource block quantity threshold corresponding to the phase tracking reference signal and the bandwidth currently scheduled by the network device for the terminal device.

Optionally, in an implementation of the first aspect, the determining a frequency domain density of the phase tracking reference signal based on the scheduled resource block quantity threshold corresponding to the phase tracking reference signal and the currently scheduled bandwidth includes: modifying, based on the phase noise of the network device, the scheduled resource block quantity threshold corresponding to the phase tracking reference signal; and determining the frequency domain density of the phase tracking reference signal based on a modified scheduled resource block quantity threshold corresponding to the phase tracking reference signal and the bandwidth currently scheduled by the network device for the terminal device.

Therefore, the frequency domain density of the phase tracking reference signal is determined based on the scheduled resource block quantity threshold corresponding to the phase tracking reference signal and the currently scheduled bandwidth. In this way, the phase tracking reference signal can be flexibly configured in frequency domain, thereby reducing a quantity of subcarriers occupied by the phase tracking reference signal, reducing resource overheads, and improving spectral efficiency.

Optionally, in an implementation of the first aspect, before the sending the phase tracking reference signal to the terminal device based on the pattern of the phase tracking reference signal, the method further includes: when the network device modifies the scheduled resource block quantity threshold corresponding to the phase tracking reference signal, sending second indication information to the terminal device, where the second indication information is used to indicate the modified scheduled resource block quantity threshold corresponding to the phase tracking reference signal; or when the network device does not modify the scheduled resource block quantity threshold corresponding to the phase tracking reference signal, sending second indication information to the terminal device, where the second indication information is confirmation information.

Optionally, in an implementation of the first aspect, that the second indication information is used to indicate the modified scheduled resource block quantity threshold corresponding to the phase tracking reference signal includes: the second indication information is used to indicate, by using a difference between the modified scheduled resource block quantity threshold corresponding to the pattern of the phase tracking reference signal and the scheduled resource block quantity threshold that corresponds to the pattern of the phase tracking reference signal and requested by the terminal device, the modified scheduled resource block quantity threshold corresponding to the pattern of the phase tracking reference signal.

Optionally, in an implementation of the first aspect, the second indication information is radio resource control signaling.

Optionally, in an implementation of the first aspect, the determining a pattern of a phase tracking reference signal includes:

determining the pattern of the phase tracking reference signal based on the factor of the impact of the phase noise of the terminal device on the signal received by the terminal device.

Optionally, in an implementation of the first aspect, the determining the pattern of the phase tracking reference signal based on the factor of the impact of the phase noise of the terminal device on the signal received by the terminal device includes: determining the modulation and coding scheme threshold and/or the scheduled resource block quantity threshold corresponding to the pattern of the phase tracking reference signal, and determining the pattern of the phase tracking reference signal, based on a comprehensive power spectral density of the phase noise of the terminal device and the network device and the factor of the impact of the phase noise of the terminal device on the signal received by the terminal device.

Optionally, in an implementation of the first aspect, the determining the pattern of the phase tracking reference signal based on a comprehensive power spectral density of the phase noise of the terminal device and the network device and the factor of the impact of the phase noise of the terminal device on the signal received by the terminal device includes: modifying the comprehensive power spectral density of the phase noise of the terminal device and the network device based on the factor of the impact of the phase noise of the terminal device on the signal received by the terminal device; and determining, based on a modified comprehensive power spectral density of the phase noise of the terminal device and the network device, the modulation and coding scheme threshold and/or the scheduled resource block quantity threshold corresponding to the pattern of the phase tracking reference signal, and determining the pattern of the phase tracking reference signal based on the modulation and coding scheme and/or the bandwidth currently scheduled by the network device for the terminal device.

Optionally, in an implementation of the first aspect, before the determining the pattern of the phase tracking reference signal based on a comprehensive power spectral density of the phase noise of the terminal device and the network device and the factor of the impact of the phase noise of the terminal device on the signal received by the terminal device, the method further includes:

estimating the comprehensive power spectral density of the phase noise of the terminal device and the network device based on a random access signal or an uplink reference signal sent by the terminal device.

Optionally, in an implementation of the first aspect, before the sending the phase tracking reference signal to the terminal device based on the pattern of the phase tracking reference signal, the method further includes:

sending the determined modulation and coding scheme threshold corresponding to the pattern of the phase tracking reference signal and/or the scheduled resource block quantity threshold corresponding to the phase tracking reference signal to the terminal device.

Therefore, the pattern of the phase tracking reference signal is determined based on the comprehensive power spectral density of the phase noise of the terminal device and the network device and the factor of the impact of the phase noise of the terminal device on the signal received by the terminal device. In this way, the phase tracking reference signal can be flexibly configured in time domain and/or in frequency domain, thereby reducing a quantity of subcarriers occupied by the phase tracking reference signal, and reducing resource overheads.

Optionally, in an implementation of the first aspect, the sending the determined modulation and coding scheme threshold corresponding to the pattern of the phase tracking reference signal and/or the scheduled resource block quantity threshold corresponding to the phase tracking reference signal to the terminal device includes: sending third indication information to the terminal device, where the third indication information is used to indicate the determined modulation and coding scheme threshold corresponding to the pattern of the phase tracking reference signal and/or the scheduled resource block quantity threshold corresponding to the phase tracking reference signal.

Optionally, in an implementation of the first aspect, the third indication information is radio resource control signaling.

Optionally, in an implementation of the first aspect, before the determining a pattern of a phase tracking reference signal, the method further includes: receiving fourth indication information sent by the terminal device, where the fourth indication information is used to indicate the at least one of the modulation and coding scheme threshold that corresponds to the pattern of the phase tracking reference signal and requested by the terminal device, the scheduled resource block quantity threshold corresponding to the phase tracking reference signal requested by the terminal device, and the factor of the impact of the phase noise of the terminal device on the signal received by the terminal device.

Optionally, in an implementation of the first aspect, the fourth indication information indicates the modulation and coding scheme threshold corresponding to the pattern of the phase tracking reference signal by using a difference between the modulation and coding scheme threshold that corresponds to the pattern of the phase tracking reference signal and requested by the terminal device and a current modulation and coding scheme threshold corresponding to the pattern of the phase tracking reference signal of the terminal device or a difference between the modulation and coding scheme threshold that corresponds to the pattern of the phase tracking reference signal and requested by the terminal device and a preconfigured modulation and coding scheme threshold corresponding to the pattern of the phase tracking reference signal of the terminal device.

Alternatively, the fourth indication information indicates the scheduled resource block quantity threshold corresponding to the pattern of the phase tracking reference signal by using a difference between the scheduled resource block quantity threshold that corresponds to the pattern of the phase tracking reference signal and requested by the terminal device and a current scheduled resource block quantity threshold corresponding to the pattern of the phase tracking reference signal of the terminal device or a difference between the scheduled resource block quantity threshold that corresponds to the pattern of the phase tracking reference signal and requested by the terminal device and a preconfigured scheduled resource block quantity threshold corresponding to the pattern of the phase tracking reference signal of the terminal device.

Optionally, in an implementation of the first aspect, before the receiving fourth indication information sent by the terminal device, the method further includes: sending fifth indication information to the terminal device, where the fifth indication information is used to indicate a first resource, and the first resource is used by the terminal device to send, to the network device, the at least one of the modulation and coding scheme threshold that corresponds to the pattern of the phase tracking reference signal and requested by the terminal device, the scheduled resource block quantity threshold corresponding to the phase tracking reference signal requested by the terminal device, and the factor of the impact of the phase noise of the terminal device on the signal received by the terminal device.

Optionally, in an implementation of the first aspect, before the sending the first resource to the terminal device, the method further includes: receiving sixth indication information sent by the terminal device, where the sixth indication information is used by the terminal device to request the first resource from the network device.

Optionally, in an implementation of the first aspect, the method further includes: sending, by the network device, seventh indication information to the terminal device, where the seventh indication information is used to indicate an effective time of the modified modulation and coding scheme threshold corresponding to the phase tracking reference signal and/or the modified scheduled resource block quantity threshold corresponding to the phase tracking reference signal that are/is sent by the network device to the terminal device, the effective time may be a time period after a time in which the terminal device receives the modified modulation and coding scheme threshold corresponding to the phase tracking reference signal and/or the modified scheduled resource block quantity threshold corresponding to the phase tracking reference signal, and the time may be in a unit of a slot, and/or a subframe, and/or a frame.

According to a second aspect, a wireless communication method is provided, including: sending, by a terminal device, first indication information to a network device, where the first indication information is used to indicate at least one of a modulation and coding scheme threshold that corresponds to a pattern of a phase tracking reference signal and requested by the terminal device, a scheduled resource block quantity threshold corresponding to the phase tracking reference signal requested by the terminal device, and a factor of impact of phase noise of the terminal device on a signal received by the terminal device; and receiving the phase tracking reference signal sent by the network device.

Therefore, the terminal device sends, to the network device, the at least one of the modulation and coding scheme threshold that corresponds to the pattern of the phase tracking reference signal and requested by the terminal device, the scheduled resource block quantity threshold corresponding to the phase tracking reference signal requested by the terminal device, and the factor of the impact of the phase noise of the terminal device on the signal received by the terminal device, so that the network device determines the pattern of the phase tracking reference signal based on the at least one of the modulation and coding scheme threshold that corresponds to the pattern of the phase tracking reference signal and requested by the terminal device, the scheduled resource block quantity threshold corresponding to the phase tracking reference signal requested by the terminal device, and the factor of the impact of the phase noise of the terminal device on the signal received by the terminal device and at least one of a modulation and coding scheme currently scheduled by the network device for the terminal device and a resource block currently scheduled by the network device for the terminal. In this way, patterns of phase tracking reference signals of different terminal devices in a case of different modulation and coding schemes and/or different scheduled bandwidth are flexibly configured, and therefore overheads of the phase tracking reference signals are reduced and spectral efficiency is improved while phase noise error compensation performance is ensured.

Optionally, in an implementation of the second aspect, the first indication information is a number of a table of the modulation and coding scheme threshold corresponding to the pattern of the phase tracking reference signal and/or a number of a table of the scheduled resource block quantity threshold corresponding to the pattern of the phase tracking reference signal.

Optionally, in an implementation of the second aspect, the first indication information is a number of a parameter associated with the modulation and coding scheme threshold corresponding to the pattern of the phase tracking reference signal and/or a number of a parameter associated with the scheduled resource block quantity threshold corresponding to the pattern of the phase tracking reference signal.

Optionally, in an implementation of the second aspect, before the receiving the phase tracking reference signal sent by the network device, the method further includes: receiving second indication information sent by the network device, where the second indication information is used to indicate a modified modulation and coding scheme threshold corresponding to the pattern of the phase tracking reference signal and/or a modified scheduled resource block quantity threshold corresponding to the phase tracking reference signal;

determining, based on the second indication information, the modified modulation and coding scheme threshold corresponding to the pattern of the phase tracking reference signal and/or the modified scheduled resource block quantity threshold corresponding to the phase tracking reference signal; and determining a time domain density and/or a frequency domain density of the phase tracking reference signal based on the modified modulation and coding scheme threshold corresponding to the pattern of the phase tracking reference signal and/or the modified scheduled resource block quantity threshold corresponding to the phase tracking reference signal, and the modulation and coding scheme scheduled by the network device for the terminal device and/or the resource block currently scheduled by the network device for the terminal device.

Optionally, in an implementation of the second aspect, the second indication information is radio resource control (RRC) signaling.

Optionally, in an implementation of the second aspect, the factor of the impact of the phase noise of the terminal device on the signal received by the terminal device includes at least one of the following parameters:

common phase noise, inter-subcarrier interference, a mean of statistical distribution with which the common phase noise is complied, a variance of the statistical distribution with which the common phase noise is complied, a mean of statistical distribution with which the inter-subcarrier interference is complied, and a variance of the statistical distribution with which the inter-subcarrier interference is complied.

Optionally, in an implementation of the second aspect, the network device and the terminal device store a mapping relationship between an interval range of the factor of the impact and an index sequence of the factor of the impact, and the sending a factor of impact of phase noise of the terminal device on a signal received by the terminal device to the network device includes: sending an index number of the factor of the impact to the network device.

Optionally, in an implementation of the second aspect, the method further includes: receiving third indication information sent by the network device, where the third indication information is used to indicate the determined modulation and coding scheme threshold corresponding to the pattern of the phase tracking reference signal and/or the scheduled resource block quantity threshold corresponding to the phase tracking reference signal;

determining, based on the third indication information, the determined modulation and coding scheme threshold corresponding to the pattern of the phase tracking reference signal and/or the scheduled resource block quantity threshold corresponding to the phase tracking reference signal; and determining a time domain density and/or a frequency domain density of the phase tracking reference signal based on the determined modulation and coding scheme threshold corresponding to the pattern of the phase tracking reference signal and/or the scheduled resource block quantity threshold corresponding to the phase tracking reference signal, and the scheduled modulation and coding scheme and/or bandwidth.

Optionally, in an implementation of the second aspect, before determining the at least one of the modulation and coding scheme threshold that corresponds to the pattern of the phase tracking reference signal and requested by the terminal device, the scheduled resource block quantity threshold corresponding to the phase tracking reference signal requested by the terminal device, and the factor of the impact of the phase noise of the terminal device on the signal received by the terminal device, the method further includes:

receiving fourth indication information sent by the network device, where the fourth indication information is used to indicate a first resource, and the first resource is used by the terminal device to send, to the network device, the at least one of the modulation and coding scheme threshold that corresponds to the pattern of the phase tracking reference signal and requested by the terminal device, the scheduled resource block quantity threshold corresponding to the phase tracking reference signal requested by the terminal device, and the factor of the impact of the phase noise of the terminal device on the signal received by the terminal device.

Optionally, in an implementation of the second aspect, before the receiving fourth indication information sent by the network device, the method further includes: sending fifth indication information to the network device, where the fifth indication information is used by the terminal device to request the first resource from the network device.

Optionally, in an implementation of the second aspect, the method further includes: receiving, by the terminal device, sixth indication information sent by the network device, where the sixth indication information is used to indicate an effective time of the modified modulation and coding scheme threshold corresponding to the phase tracking reference signal and/or the modified scheduled resource block quantity threshold corresponding to the phase tracking reference signal that are/is sent by the network device to the terminal device, the effective time may be a time period after a time in which the terminal device receives the modified modulation and coding scheme threshold corresponding to the phase tracking reference signal and/or the modified scheduled resource block quantity threshold corresponding to the phase tracking reference signal, and the time may be in a unit of a slot, and/or a subframe, and/or a frame.

According to a third aspect, a network device is provided, includes a determining module and a sending module, and can perform the method according to any one of the first aspect or the optional implementations of the first aspect.

According to a fourth aspect, a terminal device is provided, includes a sending module and a receiving module, and can perform the method according to any one of the second aspect or the optional implementations of the second aspect.

According to a fifth aspect, a network device is provided, and includes a memory, a transceiver, and a processor, where the memory stores program code that may be used to instruct to perform the method according to any one of the first aspect or the optional implementations of the first aspect, driven by the processor, the transceiver is configured to perform specific signal sending and receiving, and when the code is executed, the processor may implement the operations performed by the network device in the method.

According to a sixth aspect, a terminal device is provided, and includes a memory, a transceiver, and a processor, where the memory stores program code that may be used to instruct to perform the method according to any one of the second aspect or the optional implementations of the second aspect, driven by the processor, the transceiver is configured to perform specific signal sending and receiving, and when the code is executed, the processor may implement the operations performed by the terminal device in the method.

According to a seventh aspect, a computer storage medium is provided, where the computer storage medium stores program code, and the program code may be used to instruct to perform the method according to any one of the first aspect or the optional implementations of the first aspect.

According to an eighth aspect, a computer storage medium is provided, where the computer storage medium stores program code, and the program code may be used to instruct to perform the method according to any one of the second aspect or the optional implementations of the second aspect.

According to a ninth aspect, a communications chip is provided, where the communications chip stores an instruction, and when the instruction runs on a network device or a terminal, the network device or the terminal performs the method according to the foregoing aspect.

DESCRIPTION OF EMBODIMENTS

The following describes technical solutions of this application with reference to the accompanying drawings.

Figure 1:
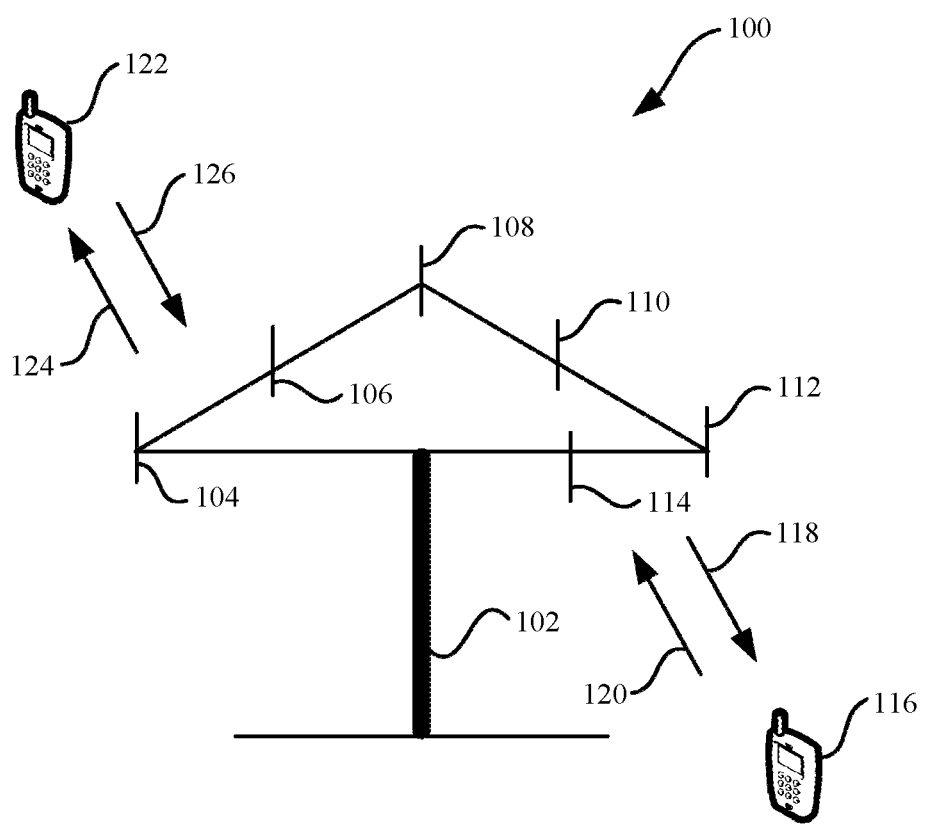
FIG. 1 is a schematic diagram of a communications system for a wireless communication method including a network device and a terminal device according to this application.

FIG. 1 is a schematic diagram of a communications system 100 including a wireless communication method and a device according to this application. As shown in FIG. 1, the communications system 100 includes a network device 102. The network device 102 may include a plurality of antennas such as antennas 104, 106, 108, 110, 112, and 114. In addition, the network device 102 may include a transmitter chain and a receiver chain. A person of ordinary skill in the art may understand that the transmitter chain and the receiver chain each may include a plurality of components (for example, a processor, a modulator, a multiplexer, a demodulator, a demultiplexer, or an antenna) related to signal sending and receiving.

The network device 102 may communicate with a plurality of terminal devices (for example, a terminal device 116 and a terminal device 122). However, it may be understood that the network device 102 may communicate with any quantity of terminal devices similar to the terminal device 116 or the terminal device 122.

As shown in FIG. 1, the terminal device 116 communicates with the antennas 112 and 114. The antennas 112 and 114 send information to the terminal device 116 over a forward link 118, and receive information from the terminal device 116 over a reverse link 120. In addition, the terminal device 122 communicates with the antennas 104 and 106. The antennas 104 and 106 send information to the terminal device 122 over a forward link 124, and receive information from the terminal device 122 over a reverse link 126.

For example, in a frequency division duplex (FDD) system, the forward link 118 may use a frequency band different from that used by the reverse link 120, and the forward link 124 may use a frequency band different from that used by the reverse link 126.

For another example, in a time division duplex (TDD) system and a full-duplex system, the forward link 118 may share a frequency band with the reverse link 120, and the forward link 124 may share a frequency band with the reverse link 126.

Each antenna (or antenna group including a plurality of antennas) or each area or both that are designed for communication are referred to as a sector of the network device 102. For example, an antenna group may be designed to communicate with a terminal device in a sector of a coverage area of the network device 102. In a process in which the network device 102 communicates with the terminal devices 116 and 122 respectively over the forward links 118 and 124, beamforming may be used in transmit antennas of the network device 102 to increase signal-to-noise ratios on the forward links 118 and 124. In addition, when the network device 102 sends, through beamforming, signals to the terminal devices 116 and 122 that are randomly dispersed in a related coverage area, interference to a mobile device in a neighboring cell is weaker than that caused in a manner in which a network device sends signals to all terminal devices of the network device through a single antenna.

At a given time, the network device 102, the terminal device 116, or the terminal device 122 may be a wireless communications sending apparatus and/or a wireless communications receiving apparatus. When sending data, the wireless communications sending apparatus may encode the data for transmission. Specifically, the wireless communications sending apparatus may obtain (for example, generate, receive from another communications apparatus, or store in a memory) a specific quantity of data bits that are to be sent to a wireless communications receiving apparatus through a channel. The data bits may be included in a data transport block (or a plurality of transport blocks), and the transport block may be segmented to generate a plurality of code blocks.

In addition, the communications system 100 may be a public land mobile network (PLMN), a D2D (Device to Device) network, an M2M (Machine to Machine) network, or another network. FIG. 1 is merely a simplified schematic diagram of an example. The network may further include another network device that is not shown in FIG. 1.

Optionally, in the present application, the network device may be a device communicating with a terminal device, for example, a network device or a network device controller. Each network device may provide communication coverage for a specific geographical area, and may communicate with a terminal device (for example, user equipment (UE)) located in the coverage area (cell). The network device may support communications protocols of different standards, or may support different communications modes. For example, the network device may be a base transceiver station (BTS) in a GSM system or a CDMA system, a NodeB (NB) in a WCDMA system, or an evolved NodeB (eNB or eNodeB) in a Long-Term Evolution (LTE) system or a wireless controller in a cloud radio access network (CRAN). Alternatively, the network device may be a network device in a future 5G network, for example, a gNB, a small cell, a micro cell, or a TRP (transmission reception point), or may be a relay station, an access point, a network device in a future evolved public land mobile network (PLMN), or the like.

Optionally, in the present application, the terminal device may be an access terminal, UE, a subscriber unit, a subscriber station, a mobile station, a mobile console, a remote station, a remote terminal, a mobile terminal, a user terminal, a terminal, a wireless communications device, a user agent, or a user apparatus. The access terminal may be a cellular phone, a cordless phone, a session initiation protocol (SIP) phone, a wireless local loop (WLL) station, a personal digital assistant (PDA), a handheld device having a wireless communication function, a computing device or another processing device connected to a wireless modem, an in-vehicle device, a wearable device, a terminal device in internet of things, a virtual reality device, a terminal device in a future 5G network, a terminal device in a future evolved public land mobile network (PLMN), or the like.

The wireless communication method and the device provided in the present application may be applied to a terminal device. The terminal device includes a hardware layer, an operating system layer running above the hardware layer, and an application layer running above the operating system layer. The hardware layer includes hardware such as a central processing unit (CPU), a memory management unit (MMU), and a memory (also referred to as a main memory). The operating system may be any one or more computer operating systems that process a service by using a process, for example, a Linux operating system, a Unix operating system, an Android operating system, an iOS operating system, or a Windows operating system. The application layer includes applications such as a browser, an address book, word processing software, and instant messaging software.

In addition, various aspects or features of this application may be implemented as a method, an apparatus, or a product that uses standard programming and/or engineering technologies. The term "product" used in the present application covers a computer program that can be accessed from any computer readable component, carrier, or medium. For example, the computer readable medium may include but is not limited to a magnetic storage device (for example, a hard disk, a floppy disk, or a magnetic tape), an optical disc (for example, a compact disc (CD) or a digital versatile disc (DVD)), a smart card, or a flash storage device (for example, an erasable programmable read-only memory (EPROM), a card, a stick, or a key drive). In addition, various storage media described in this specification may indicate one or more devices and/or other machine readable media that are configured to store information. The term "machine readable media" may include but is not limited to various media that can store, include, and/or carry an instruction and/or data.

The following describes the present application with reference to FIG. 2 to FIG. 9 with respect to an exemplary system that is the same as or similar to the system shown in FIG. 1.

Figure 2:
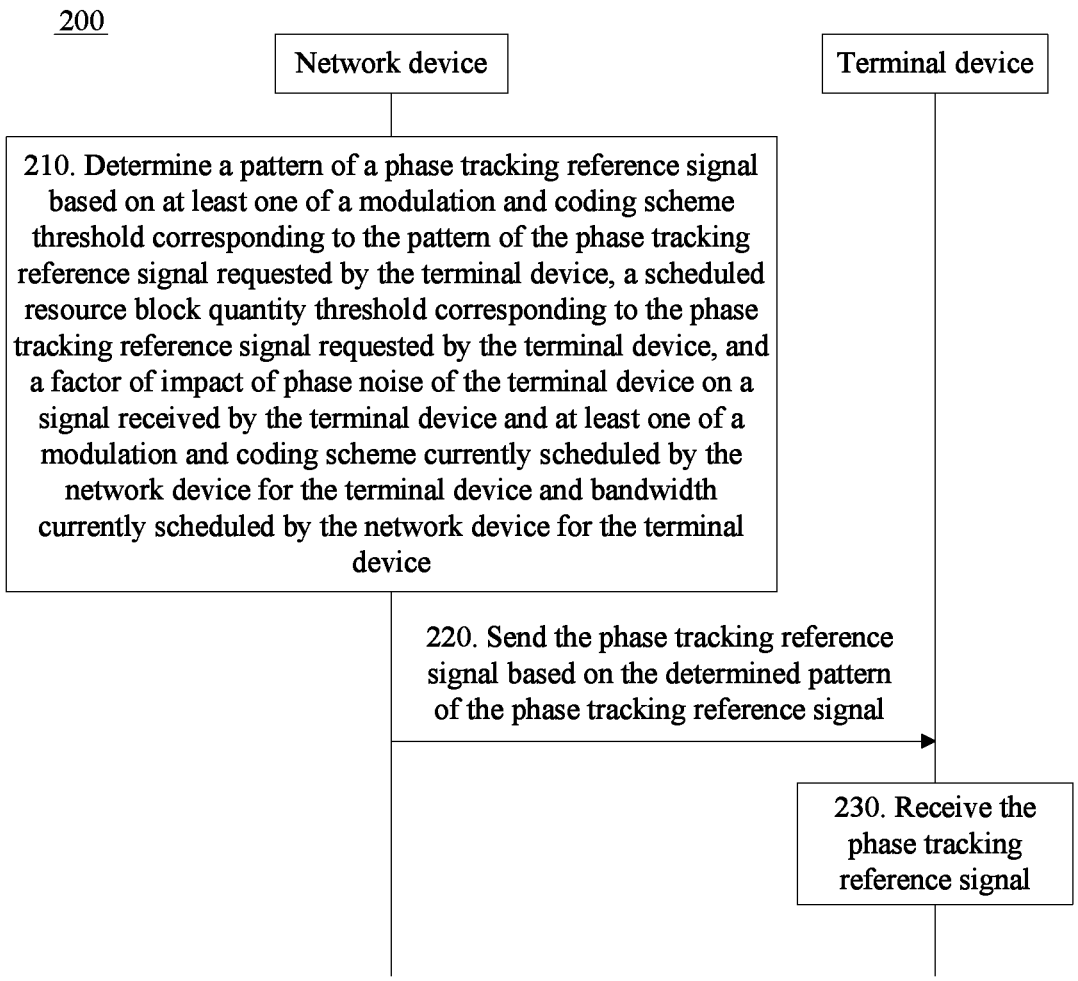
FIG. 2 is a schematic flowchart of a wireless communication method according to this application.

FIG. 2 is a schematic flowchart of a wireless communication method 200 according to this application. As shown in FIG. 2, the method 200 includes the following process.

At block 210, a network device determines a pattern of a phase tracking reference signal based on at least one of a modulation and coding scheme threshold that corresponds to the pattern of the phase tracking reference signal and requested by a terminal device, a scheduled resource block quantity threshold that corresponds to the pattern of the phase tracking reference signal and requested by the terminal device, and a factor of impact of phase noise of the terminal device on a signal received by the terminal device and at least one of a modulation and coding scheme currently scheduled by the network device for the terminal device and bandwidth currently scheduled by the network device for the terminal device.

Optionally, before the network device determines the pattern of the phase tracking reference signal, the method further includes: receiving, by the network device, the at least one of the modulation and coding scheme threshold that corresponds to the pattern of the phase tracking reference signal and requested by the terminal device, the scheduled resource block quantity threshold that corresponds to the pattern of the phase tracking reference signal and requested by the terminal device, and the factor of the impact of the phase noise of the terminal device on the signal received by the terminal device.

Optionally, the terminal device recommends the modulation and coding scheme threshold and/or the scheduled resource block quantity threshold that indicate/indicates the presence/pattern of the PTRS.

Optionally, the modulation and coding scheme threshold and the scheduled resource block quantity threshold each may be expressed as (M+N) bits, where M is used to represent a threshold, and N is used to represent a ranking of the threshold. When the threshold is the modulation and coding scheme threshold corresponding to the pattern of the phase tracking reference signal, bits required by M depend on a total quantity of modulation and coding scheme thresholds. In a current LTE system, modulation and coding scheme thresholds are 0 to 28, which are totally 29 bits. Therefore, M requires 5 bits. A value of N is determined based on a quantity of thresholds. If there are three specified modulation and coding scheme (MCS) thresholds: $T_{MCS}^1$, $T_{MCS}^2$, and $T_{MCS}^3$, N requires 2 bits. If the modulation and coding scheme threshold sent by the terminal device is (01111+01), it indicates that a third threshold is 16. If all of the three thresholds need to be fed back, the modulation and coding scheme threshold may be alternatively expressed as (M+M+M). If only some of the thresholds need to be updated, (M+N) may be used to indicate a specific to-be-updated threshold and a ranking of the to-be-updated MCS threshold.

When the threshold is the scheduled resource block quantity threshold corresponding to the pattern of the phase tracking reference signal, bits required by M depend on a quantity of resource blocks RBs. In a current LTE system, a maximum quantity of scheduled resource blocks is usually 100. Therefore, M requires 7 bits. A value of N is determined based on a quantity of scheduled resource block quantity thresholds.

It should be understood that a value of M and the value of N may be adjusted based on an actual case.

It should be further understood that the modulation and coding scheme threshold and the scheduled resource block quantity threshold may be alternatively expressed in another form. This is not limited in the present application.

Optionally, before the network device determines the pattern of the phase tracking reference signal based on the at least one of the modulation and coding scheme threshold that corresponds to the pattern of the phase tracking reference signal and requested by the terminal device, the scheduled resource block quantity threshold that corresponds to the pattern of the phase tracking reference signal and requested by the terminal device, and the factor of the impact of the phase noise of the terminal device on the signal received by the terminal device and the at least one of the modulation and coding scheme currently scheduled by the network device for the terminal device and the bandwidth currently scheduled by the network device for the terminal device, the method further includes:

receiving, by the network device, a number of a table of the modulation and coding scheme threshold corresponding to the pattern of the phase tracking reference signal and/or a number of a table of the scheduled resource block quantity threshold corresponding to the pattern of the phase tracking reference signal that are/is sent by the terminal device.

For example, if numbers of tables of the modulation and coding scheme threshold corresponding to the pattern of the phase tracking reference signal are 0 to 11, when the terminal device reports 1 to the network device, it indicates that the number of the table of the modulation and coding scheme threshold that corresponds to the pattern of the phase tracking reference signal and requested by the terminal device is 1.

For another example, tables of the modulation and coding scheme threshold corresponding to the pattern of the phase tracking reference signal may be numbered by group. Tables 0 to 3 are a first group, tables 4 to 7 are a second group, and tables 8 to 11 are a third group. When the number of the table of the modulation and coding scheme threshold that corresponds to the pattern of the phase tracking reference signal and requested by the terminal device is 3, a number that is of a table of the modulation and coding scheme threshold and that is sent to the network device is 1+4, where 1 indicates the first group, and 4 indicates a fourth table in the first group.

It should be understood that the manner in which the terminal device reports the number of the table of the modulation and coding scheme threshold corresponding to the pattern of the phase tracking reference signal is merely an example. Alternatively, the terminal device may report the number of the table of the modulation and coding scheme threshold corresponding to the pattern of the phase tracking reference signal in another manner. This is not limited in the present application.

It should be understood that for a manner in which the terminal device reports the number of the table of the scheduled resource block quantity threshold corresponding to the pattern of the phase tracking reference signal, refer to the manner in which the terminal device reports the number of the table of the modulation and coding scheme threshold corresponding to the pattern of the phase tracking reference signal. To avoid repetition, details are not described herein again.

Optionally, before the network device determines the pattern of the phase tracking reference signal based on the at least one of the modulation and coding scheme threshold that corresponds to the pattern of the phase tracking reference signal and requested by the terminal device, the scheduled resource block quantity threshold that corresponds to the pattern of the phase tracking reference signal and requested by the terminal device, and the factor of the impact of the phase noise of the terminal device on the signal received by the terminal device and the at least one of the modulation and coding scheme currently scheduled by the network device for the terminal device and the bandwidth currently scheduled by the network device for the terminal device, the method further includes:

receiving, by the network device, a number of a parameter associated with the modulation and coding scheme threshold corresponding to the pattern of the phase tracking reference signal and/or a number of a parameter associated with the scheduled resource block quantity threshold corresponding to the pattern of the phase tracking reference signal that are/is sent by the terminal device; and determining, based on the number of the parameter associated with the modulation and coding scheme threshold corresponding to the pattern of the phase tracking reference signal and/or the number of the parameter associated with the scheduled resource block quantity threshold corresponding to the pattern of the phase tracking reference signal that are/is sent by the terminal device, the modulation and coding scheme threshold that corresponds to the pattern of the phase tracking reference signal and requested by the terminal device and the scheduled resource block quantity threshold that corresponds to the pattern of the phase tracking reference signal and requested by the terminal device.

Optionally, the parameter associated with the modulation and coding scheme threshold corresponding to the pattern of the phase tracking reference signal, or the parameter associated with the modulation and coding scheme threshold corresponding to the pattern of the phase tracking reference signal, or both include at least one of the following parameters: a frequency, a phase noise model of the terminal device, a subcarrier spacing, and a phase noise processing capability of a receiver.

Specifically, because phase noise levels in phase noise models of different terminal devices are different at different frequencies and different receivers have different phase noise resistance capabilities on different subcarriers, patterns of phase tracking reference signals that are required by the terminal devices are different, to be specific, modulation and coding scheme thresholds corresponding to the patterns of the phase tracking reference signals and the scheduled resource block quantity thresholds corresponding to the patterns of the phase tracking reference signals are also different. Therefore, the terminal device may recommend or report, to the network device, the number of the parameter associated with the modulation and coding scheme threshold corresponding to the pattern of the phase tracking reference signal and/or the number of the parameter associated with the scheduled resource block quantity threshold corresponding to the pattern of the phase tracking reference signal. The number of the parameter corresponds to a corresponding parameter and the modulation and coding scheme threshold corresponding to the pattern of the phase tracking reference signal or the scheduled resource block quantity threshold corresponding to the pattern of the phase tracking reference signal.

It should be understood that a time domain density and a frequency domain density correspond to different parameter numbers. Because the frequency, the phase noise model, the subcarrier spacing, and the phase noise processing capability of the receiver exert different impact on the time domain density and the frequency domain density, the time domain density and the frequency domain density may be separately numbered. For example, numbers of parameters associated with the time domain density and the MCS are 0 to K1, and numbers of parameters associated with the frequency domain density and the BW are 0 to K2.

Optionally, the terminal device may uniformly number the plurality of parameters, and report the numbered parameters to the network device.

Specifically, numbers of all parameter combinations are indicated by using N bits, where N=ceil(log 2(M)), and M indicates a total quantity of parameter combinations. In this solution, load of content recommended or reported by the terminal device can be reduced, and signaling overheads of configuring an associated table by a base station can be reduced.

For example, as shown in Table 1, parameter combination numbers in Table 1 correspond to different parameters, and each parameter combination number corresponds to one MCS threshold table and/or one resource block quantity threshold table. When the terminal device sends "000" to the network device, it indicates that the parameter combination number is 0, and an MCS threshold and/or a resource block quantity threshold requested by the terminal device may be determined based on the parameter combination number. For example, a number of a table of an MCS threshold corresponding to the parameter combination number 1 is 1, and reporting, by UE, the parameter combination number 1 may be understood as recommending, by the UE, an MCS threshold corresponding to the MCS threshold table with the number 1.

TABLE 1

| Signaling content | Table number or parameter combination number | Remark and description |
|---|---|---|
| 000 | 0 | 30 GHz, 60 kHz, phase noise model 1 |
| 001 | 1 | 30 GHz, 60 kHz, phase noise model 2 |
| 010 | 2 | 30 GHz, 120 kHz, phase noise model 1 |
| 011 | 3 | 30 GHz, 120 kHz, phase noise model 2 |
| 100 | 4 | 40 GHz, 120 kHz, phase noise model 1 |
| 101 | 5 | 40 GHz, 120 kHz, phase noise model 2 |
| 110 | 6 | 70 GHz, 480 kHz, phase noise model 1 |
| 111 | 7 | 70 GHz, 480 kHz, phase noise model 2 |

Optionally, the terminal device may separately number the plurality of parameters, and report the numbered parameters to the network device.

Specifically, numbering separately means that parameters are separately numbered. For example, N1+N2+N3+ . . . bits are used to indicate a number of a specific parameter combination, and Ni represents a quantity of bits required by a number of an input factor. For example, N1=2 bits are used to represent a number corresponding to the frequency, N2=3 bits are used to represent a number corresponding to the subcarrier spacing, N3=2 bits are used to indicate a number of the phase noise model, and N4=1 bit is used to indicate a number corresponding to the phase noise processing capability of the receiver.

Optimal associated tables (namely, a table of a correspondence between a time domain density and an MCS that includes an MCS threshold of each time domain density and/or a table of a correspondence between a frequency domain density and a scheduled resource block quantity that includes a scheduled resource block quantity threshold of each frequency domain density) corresponding to all parameters may be separately recommended/reported by the terminal device, and separately configured by the network device, thereby implementing relatively high flexibility. When a parameter changes, for example, the subcarrier spacing changes from 60 kHz to 120 kHz, the terminal device may recommend/report only a number corresponding to the subcarrier, and the network device may configure only a bit corresponding to the subcarrier spacing, namely, a bit corresponding to the subcarrier, to reselect an associated table. In addition, in this solution, some of signaling used for other functions, for example, the subcarrier spacing and the frequency, may be reused. For another example, if switching is performed only to a frequency or a subcarrier known by the network device, the terminal device does not need to perform recommending again.

For example, as shown in Table 2, in signaling, the first two bits represent the frequency {30 GHz, 40 GHz, 70 GHz, reserved}, the middle two bits represent the subcarrier spacing {60 kHz, 120 kHz, 240 kHz, 480 kHz}, and the last bit represents the phase noise model {phase noise model 1, phase noise model 2}.

TABLE 2

| Signaling content | Table number or parameter combination number | Remark and description |
|---|---|---|
| 00 + 00 + 0 | 0 | 30 GHz, 60 kHz, phase noise model 1 |
| 00 + 00 + 1 | 1 | 30 GHz, 60 kHz, phase noise model 2 |
| 00 + 01 + 0 | 2 | 30 GHz, 120 kHz, phase noise model 1 |
| 00 + 01 + 1 | 3 | 30 GHz, 120 kHz, phase noise model 2 |
| . . . + . . . + . . . | . . . | — |
| 01 + 01 + 0 | 10 | 40 GHz, 120 kHz, phase noise model 1 |
| 01 + 01 + 1 | 11 | 40 GHz, 120 kHz, phase noise model 2 |
| . . . + . . . + . . . | . . . | — |
| 10 + 11 + 0 | 22 | 70 GHz, 480 kHz, phase noise model 1 |
| 10 + 11 + 1 | 23 | 70 GHz, 480 kHz, phase noise model 2 |
| . . . + . . . + . . . | . . . | — |

Figure 3:
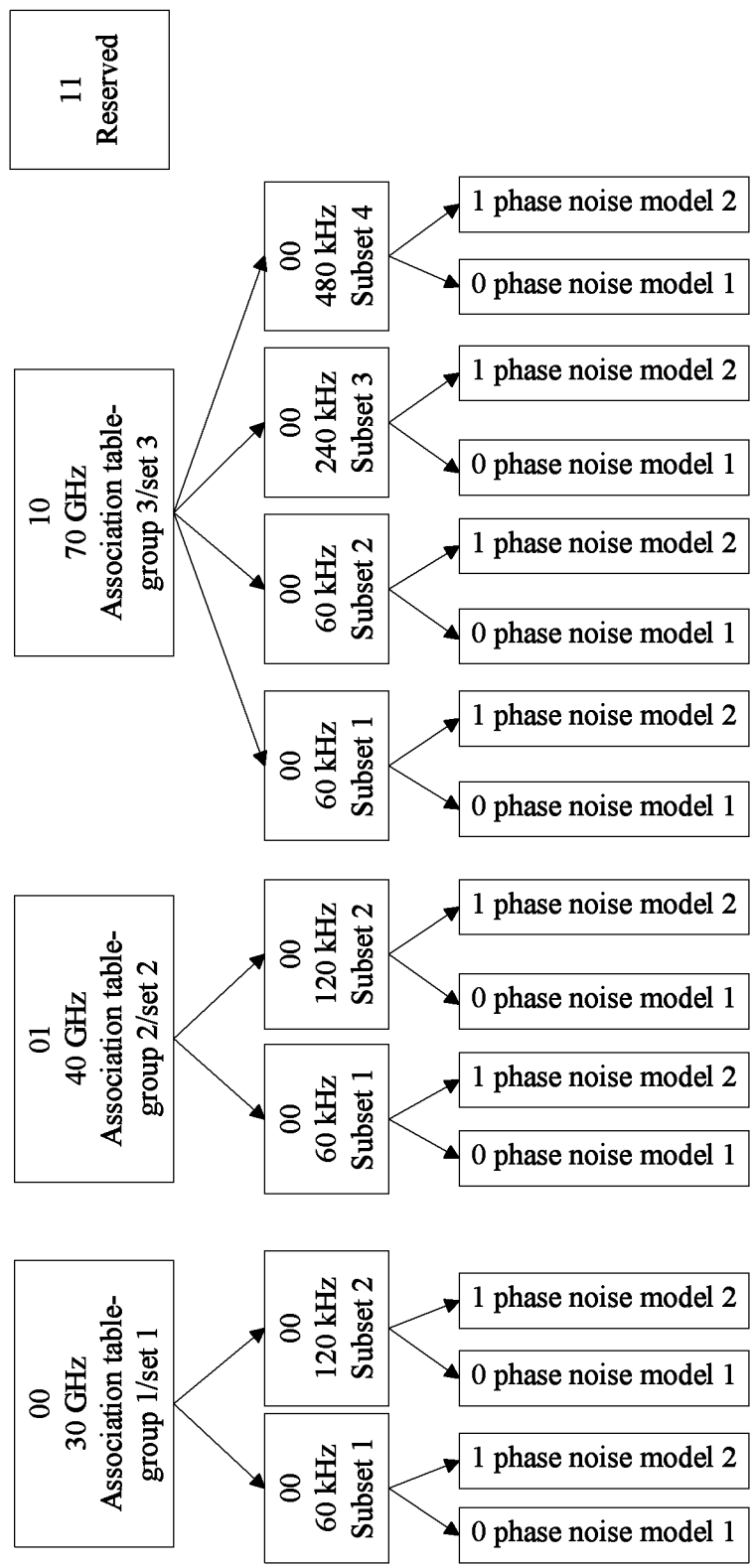
FIG. 3 is a schematic diagram of a number of a table that is reported by a terminal device by level and group according to this application.

For example, numbering separately may be alternatively expressed in a form of hierarchical grouping. As shown in FIG. 3, a frequency represents a first level, a subcarrier represents a second level, and a phase noise model represents a third level. In FIG. 3, there are frequencies: 30 GHz, 40 GHz, and 70 GHz. Further, there is a subset 1 with a subcarrier of 60 kHz and a subset 2 with a subcarrier of 120 kHz in a case of the frequency 30 GHz, there is a phase noise model 1 and a phase noise model 2 in a case of the subset 1 with the subcarrier of 60 kHz, and there is a phase noise model 1 and a phase noise model 2 in a case of the subset 2 with the subcarrier of 120 kHz. When the terminal device reports 00000, the network device may determine, based on the reported content, an MCS threshold and/or a resource block quantity threshold requested by the terminal device.

Optionally, the terminal device may separately number a first part of the plurality of parameters, uniformly number a second part of the plurality of parameters, and then report the plurality of parameters to the network device. For example, the terminal device uniformly numbers the phase noise processing capability of the receiver in the terminal device and the phase noise model, and separately numbers the frequency and the subcarrier.

Optionally, the terminal device sends, to the network device based on different configuration periods or different configuration triggering conditions, the number of the table of the modulation and coding scheme threshold corresponding to the pattern of the phase tracking reference signal and/or the number of the table of the scheduled resource block quantity threshold corresponding to the pattern of the phase tracking reference signal.

Optionally, the terminal device reports a number of the phase noise model or a number of a phase noise level of the terminal device to the network device. The number of the phase noise model or the number of the phase noise level of the terminal device that is reported by the terminal device to the network device may be reported as a capability of the terminal device.

Optionally, the terminal device reports a number of the phase noise resistance capability of the terminal device to the network device. The phase noise resistance capability of the terminal device requires a comprehensive consideration of phase noise, an algorithm of the receiver in the terminal device, the phase noise model of the terminal device, and the like. The number of the phase noise resistance capability of the terminal device that is reported by the terminal device to the network device may be reported as a capability of the terminal device.

It should be understood that the number of the table or the parameter combination number mentioned in the foregoing description may be alternatively an index (index).

Optionally, the terminal device may send, to the network device by using an RRC report, the at least one of the modulation and coding scheme threshold that corresponds to the pattern of the phase tracking reference signal and requested by the terminal device, the scheduled resource block quantity threshold that corresponds to the pattern of the phase tracking reference signal and requested by the terminal device, and the factor of the impact of the phase noise of the terminal device on the signal received by the terminal device.

Optionally, the terminal device sends a difference of the modulation and coding scheme threshold corresponding to the pattern of the phase tracking reference signal to the network device. The difference is a difference between the modulation and coding scheme threshold that corresponds to the pattern of the phase tracking reference signal and requested by the terminal device and a modulation and coding scheme threshold corresponding to a pattern of a current phase tracking reference signal of the terminal device.

Alternatively, the terminal device sends a difference of the scheduled resource block quantity threshold corresponding to the pattern of the phase tracking reference signal to the network device. The difference is a difference between the scheduled resource block quantity threshold that corresponds to the pattern of the phase tracking reference signal and requested by the terminal device and a scheduled resource block quantity threshold corresponding to a pattern of a current phase tracking reference signal of the terminal device. Optionally, the factor of the impact of the phase noise of the terminal device on the signal received by the terminal device includes at least one of the following parameters: common phase noise, inter-subcarrier interference, a mean of statistical distribution with which the common phase noise is complied, a variance of the statistical distribution with which the common phase noise is complied, a mean of statistical distribution with which the inter-subcarrier interference is complied, and a variance of the statistical distribution with which the inter-subcarrier interference is complied.

Specifically, the factor of the impact of the phase noise of the terminal device on the signal received by the terminal device includes a common phase error and/or inter-subcarrier interference caused by the phase noise. The common phase error and the inter-subcarrier interference each are a random number, and comply with specific statistical distribution. Therefore, a statistical feature such as a variance or a mean of the factor of the impact may be fed back.

Optionally, the network device and the terminal device store a mapping relationship between an interval range of the factor of the impact and an index sequence of the factor of the impact. The sending the factor of the impact of the phase noise of the terminal device on the signal received by the terminal device to the network device includes sending an index number of the factor of the impact to the network device.

Specifically, if a relatively large quantity of resources are occupied for directly feeding back the factor of the impact or the statistical feature of the factor of the impact, a mapping relationship between the factor of the impact or the statistical feature of the factor of the impact and an index number may be set, and the index number of the factor of the impact or an index number of the statistical feature of the factor of the impact may be directly fed back to the network device. As shown in Table 3, when a variance of the common phase error falls within $\delta_1$, the index number 1 is sent to the network device.

It should be understood that Table 3 is merely an example of feeding back, by the terminal device, the factor of the impact to the network device. A total quantity of index numbers may be set in an actual case. This is not limited in the present application.

TABLE 3

Mapping relationships between a factor of impact and feedback content

| | $\delta$ | | | | | | |
|---|---|---|---|---|---|---|---|
| | $\delta_1$ | $\delta_2$ | $\delta_3$ | $\delta_4$ | $\delta_5$ | $\delta_6$ | $\delta_7$ |
| Common phase error index number | 1 | 2 | 3 | 4 | 5 | 6 | 7 |

Optionally, that a network device determines a pattern of a phase tracking reference signal includes: determining a time domain density of the phase tracking reference signal based on the modulation and coding scheme threshold that corresponds to the pattern of the phase tracking reference signal and requested by the terminal device and the currently scheduled modulation and coding scheme.

Specifically, in a case of the determined the modulation and coding scheme (MCS) threshold, the modulation and coding scheme may implicitly indicate the time domain density of the phase tracking reference signal (PTRS). As shown in Table 4, the time domain density of the phase tracking reference signal of the terminal device in the current scheduling status may be determined based on the determined MCS threshold corresponding to the pattern of the phase tracking reference signal and the currently scheduled modulation and coding scheme.

TABLE 4

Association relationship between an MCS
and a time domain density of a PTRS

| MCS | Time domain density |
|---|---|
| $0 \leq MCS < T_{MCS}^1$ | 0 |
| $T_{MCS}^1 \leq MCS < T_{MCS}^2$ | 1/4 |
| $T_{MCS}^2 \leq MCS < T_{MCS}^3$ | 1/2 |
| $T_{MCS}^3 \leq MCS$ | 1 |

The association relationship between the modulation and coding scheme threshold and the time domain density of the phase tracking reference signal may be alternatively expressed as a formula, for example, formula (1):

$$D_T = \begin{cases} 0 & 0 \leq MCS < T_{MCS}^1 \\ 1/4 & T_{MCS}^1 \leq MCS < T_{MCS}^2 \\ 1/2 & T_{MCS}^2 \leq MCS < T_{MCS}^3 \\ 1 & T_{MCS}^3 \leq MCS \end{cases} \quad (1)$$

where $D_T$ indicates a time domain density.

It should be understood that Table 4 and formula (1) are merely examples of the association relationship between the MCS threshold and the time domain density of the PTRS. The association relationship between the MCS threshold and the time domain density of the PTRS may be alternatively expressed in another form. This is not limited in the present application. In addition, the time domain densities in Table 4 and formula (1) are also merely examples. One PTRS may be sent by using every symbol, every two symbols, or every four symbols. The time domain density may be alternatively expressed in another form. This is not limited in the present application.

Optionally, the determining, by the network device, a time domain density of the phase tracking reference signal based on the modulation and coding scheme threshold that corresponds to the pattern of the phase tracking reference signal and requested by the terminal device and the currently scheduled modulation and coding scheme includes:

modifying, based on phase noise of the network device, the modulation and coding scheme threshold corresponding to the pattern of the phase tracking reference signal; and determining the time domain density of the phase tracking reference signal based on a modified modulation and coding scheme threshold corresponding to the pattern of the phase tracking reference signal and the currently scheduled modulation and coding scheme.

Specifically, when the network device receives the modulation and coding scheme threshold that corresponds to the pattern of the phase tracking reference signal and requested by the terminal device, a power spectral density of the phase noise of the network device is relatively high, and the phase noise of the network device exerts relatively great impact on a signal. However, the MCS threshold that corresponds to the pattern of the phase tracking reference signal and requested by the terminal device is relatively high. Therefore, to ensure communication reliability, the network device modifies the MCS threshold that corresponds to the pattern of the phase tracking reference signal and requested by the terminal device, and decreases the MCS threshold, and the network device determines the time domain density of the phase tracking reference signal based on the modified modulation and coding scheme threshold corresponding to the pattern of the phase tracking reference signal and the currently scheduled modulation and coding scheme.

Optionally, before sending the phase tracking reference signal to the terminal device based on the pattern of the phase tracking reference signal, the method further includes: when the network device modifies the modulation and coding scheme threshold corresponding to the pattern of the phase tracking reference signal, sending first indication information to the terminal device, where the first indication information is used to indicate the modified modulation and coding scheme threshold corresponding to the pattern of the phase tracking reference signal; or when the network device does not modify the modulation and coding scheme threshold corresponding to the pattern of the phase tracking reference signal, sending first indication information to the terminal device, where the first indication information is confirmation information.

Specifically, if the power spectral density of the phase noise of the network device is relatively high, and the phase noise exerts relatively great impact on a signal, the network device modifies the modulation and coding scheme threshold that corresponds to the pattern of the phase tracking reference signal and requested by the terminal device, and the network device sends the first indication information to the terminal device, to indicate the modified modulation and coding scheme threshold corresponding to the pattern of the phase tracking reference signal. If the power spectral density of the phase noise of the network device is relatively ideal, and the phase noise exerts no impact on a signal, or the impact may be ignored, the network device does not modify the modulation and coding scheme threshold that corresponds to the pattern of the phase tracking reference signal and requested by the terminal device, and the network device sends the first indication information to the terminal device, where the first indication information is the confirmation information, and the first indication information may be RRC signaling.

It should be understood that information about the modulation and coding scheme threshold may be expressed as (M+N) or (M+M+M). A specific method is similar to the foregoing expression form of the information about the modulation and coding scheme threshold fed back by the terminal device. To avoid repetition, details are not described herein again.

Optionally, that the first indication information is used to indicate the modified modulation and coding scheme threshold corresponding to the pattern of the phase tracking reference signal includes:

the first indication information is used to indicate, by using a difference between the modified modulation and coding scheme threshold corresponding to the pattern of the phase tracking reference signal and the modulation and coding scheme threshold that corresponds to the pattern of the phase tracking reference signal and requested by the terminal device, the modified modulation and coding scheme threshold corresponding to the pattern of the phase tracking reference signal.

Specifically, the network device may send, to the terminal device, the difference between the modified modulation and coding scheme threshold corresponding to the pattern of the phase tracking reference signal and the modulation and coding scheme threshold that corresponds to the pattern of the phase tracking reference signal and requested by the terminal device. For example, if the threshold that corresponds to the pattern of the phase tracking reference signal and requested by the terminal device is $T'^1_{MCS}$, and the network device adjusts the threshold corresponding to the pattern of the requested phase tracking reference signal to $T''_{MCS}{}^1$, the network device sends the difference of $T''_{MCS}{}^1 - T'_{MCS}{}^1$ to the terminal device by using the first indication information.

Optionally, the first indication information may be a number that is of a table of the modulation and coding scheme threshold and that is requested or reported by the terminal device.

Optionally, the first indication information may be a difference between a specified number and a number that is of a table of the modulation and coding scheme threshold and that is requested or reported by the terminal device. The specified number may be a default configured number or a latest configured number of the table of the modulation and coding scheme threshold.

Optionally, the first indication information may be a number of a table of the modified modulation and coding scheme threshold.

Specifically, if the phase noise of the network device is relatively loud, the phase noise of the network device together with the number recommended by the terminal device or the capability reported by the terminal device is considered, to select a number corresponding to an optimal table.

The first indication information may be a number that is of a parameter associated with the modulation and coding scheme threshold and that is requested or reported by the terminal device.

Optionally, the first indication information may be a difference between a specified number and a number that is of a parameter associated with the modulation and coding scheme threshold and that is requested or reported by the terminal device. The specified number may be a default configured number or a latest configured number of the parameter associated with the modulation and coding scheme threshold.

Optionally, the first indication information may be a number of a parameter associated with the modified modulation and coding scheme threshold.

Specifically, if the phase noise of the network device is relatively loud, the phase noise of the network device together with the number recommended by the terminal device or the capability reported by the terminal device is considered, to select a number corresponding to an optimal associated parameter.

Optionally, the determining a pattern of a phase tracking reference signal includes: determining a frequency domain density of the phase tracking reference signal based on the scheduled resource block quantity threshold corresponding to the phase tracking reference signal and the bandwidth currently scheduled by the network device for the terminal device.

Specifically, in a case of the determined resource block quantity threshold, the currently scheduled bandwidth may implicitly indicate the frequency domain density of the PTRS. As shown in Table 5, the frequency domain density of the phase tracking reference signal of the terminal device at the currently scheduled bandwidth may be determined based on the determined resource block quantity threshold corresponding to the pattern of the phase tracking reference signal and the bandwidth currently scheduled by the network device for the terminal device.

TABLE 5

Association relationship between a resource block quantity threshold and a frequency domain density of a PTRS

| Fixed bandwidth | Frequency domain density (every 12 subcarriers) |
| --- | --- |
| $0 \leq M_{RB} < T_{RB}^1$ | 0 |
| $T_{RB}^1 \leq M_{RB} < T_{RB}^2$ | 1 subcarrier |
| $T_{RB}^2 \leq M_{RB} < T_{RB}^3$ | ½+12 subcarrier |
| $T_{RB}^3 \leq M_{RB} < T_{RB}^4$ | ¼ subcarrier |
| $T_{RB}^4 \leq M_{RB} < T_{RB}^5$ | ⅛ subcarrier |
| $T_{RB}^5 \leq M_{RB}$ | 1/16 subcarrier |

The association relationship between the resource block quantity threshold and the frequency domain density of the phase tracking reference signal may be alternatively expressed as a formula, for example, formula (2):

$$D_F = \begin{cases} 0 & 0 \leq N_{PRB} < T_{RB}^1 \\ 1 & T_{RB}^1 \leq N_{PRB} < T_{RB}^2 \\ 1/2 & T_{RB}^2 \leq N_{PRB} < T_{RB}^3 \\ 1/4 & T_{RB}^3 \leq N_{PRB} < T_{RB}^4 \\ 1/8 & T_{RB}^4 \leq N_{PRB} < T_{RB}^5 \\ 1/16 & T_{RB}^5 \leq N_{PRB} \end{cases} \quad (2)$$

It should be understood that Table 5 and formula (2) are merely examples of the association relationship between the scheduled resource block quantity threshold and the frequency domain density of the PTRS. The association relationship between the scheduled resource block quantity threshold and the frequency domain density of the PTRS may be alternatively expressed in another form. This is not limited in the present application. In addition, the frequency domain density in Table 5 is merely an example. One PTRS may be sent by using every RB or every two RBs. The frequency domain density may be alternatively expressed in another form. This is not limited in the present application.

Table 4 or formula (1) may be used to indicate the relationship between the time domain density of the PTRS and the modulation and coding scheme, and Table 5 or formula (2) may be used to indicate the relationship between the frequency domain density of the PTRS and the bandwidth. In addition, RRC signaling is supported in configuring the modulation and coding scheme threshold and/or the scheduled resource block quantity threshold.

Optionally, the determining, by the network device, a frequency domain density of the phase tracking reference signal based on the scheduled resource block quantity threshold that corresponds to the pattern of the phase tracking reference signal and requested by the terminal device and the bandwidth currently scheduled by the network device for the terminal device includes: modifying, based on the phase noise of the network device, the scheduled resource block quantity threshold corresponding to the pattern of the phase tracking reference signal; and determining the frequency domain density of the phase tracking reference signal based on a modified scheduled resource block quantity threshold and the bandwidth currently scheduled by the network device for the terminal device.

Specifically, when the network device receives the scheduled resource block quantity threshold that corresponds to the pattern of the phase tracking reference signal and requested by the terminal device, the power spectral density of the phase noise of the network device is relatively high, and the phase noise of the network device exerts relatively great impact on a signal. However, the scheduled resource block quantity threshold that corresponds to the pattern of the phase tracking reference signal and requested by the network device is relatively small. Therefore, to ensure communication reliability, the network device modifies the scheduled resource block quantity threshold that corresponds to the pattern of the phase tracking reference signal and requested by the network device, and increases the scheduled resource block quantity threshold, and the network device determines the frequency domain density of the phase tracking reference signal based on the modified scheduled resource block quantity threshold corresponding to the pattern of the phase tracking reference signal and the bandwidth currently scheduled by the network device for the terminal device.

Optionally, before sending the phase tracking reference signal to the terminal device based on the pattern of the phase tracking reference signal, the method further includes: when the network device modifies the scheduled resource block quantity threshold corresponding to the pattern of the phase tracking reference signal, sending second indication information to the terminal device, where the second indication information is used to indicate the modified scheduled resource block quantity threshold corresponding to the pattern of the phase tracking reference signal; or when the network device does not modify the scheduled resource block quantity threshold corresponding to the pattern of the phase tracking reference signal, sending second indication information to the terminal device, where the second indication information is confirmation information.

Specifically, if the power spectral density of the phase noise of the network device is relatively high, and the phase noise exerts relatively great impact on a signal, the network device modifies the scheduled resource block quantity threshold that corresponds to the pattern of the phase tracking reference signal and requested by the terminal device, and the network device sends the second indication information to the terminal device, to indicate the modified scheduled resource block quantity threshold corresponding to the pattern of the phase tracking reference signal. If the power spectral density of the phase noise of the network device is relatively ideal, and the phase noise exerts no impact on a signal, or the impact may be ignored, the network device does not modify the scheduled resource block quantity threshold that corresponds to the pattern of the phase tracking reference signal and requested by the terminal device, and the network device sends the second indication information to the terminal device, where the second indication information is the confirmation information, and the second indication information may be RRC signaling.

Optionally, that the second indication information is used to indicate the modified scheduled resource block quantity threshold corresponding to the pattern of the phase tracking reference signal includes:

the second indication information is used to indicate, by using a difference between the modified modulation and coding scheme threshold corresponding to the pattern of the phase tracking reference signal and the scheduled resource block quantity threshold that corresponds to the pattern of the phase tracking reference signal and requested by the terminal device, the modified scheduled resource block quantity threshold corresponding to the pattern of the phase tracking reference signal.

Specifically, the network device may send, to the terminal device, the difference between the modified scheduled resource block quantity threshold corresponding to the pattern of the phase tracking reference signal and the scheduled resource block quantity threshold that corresponds to the pattern of the phase tracking reference signal and requested by the terminal device. For example, if the threshold that corresponds to the pattern of the phase tracking reference signal and requested by the terminal device is $T_{RB}^{1'}$, and the network device adjusts the threshold corresponding to the pattern of the requested phase tracking reference signal to $T_{RB}^{1''}$, the network device sends the difference of $T_{RB}^{1''} - T_{RB}^{1'}$ to the terminal device by using the second indication information.

It should be understood that information about the scheduled resource block quantity threshold may be expressed as (M+N) or (M+M+M). A specific method is similar to the foregoing expression form of the information about the scheduled resource block quantity threshold fed back by the terminal device. To avoid repetition, details are not described herein again. The PTRS is mapped when a modulation and coding scheme/bandwidth exceeds a modulation and coding scheme threshold or a scheduled resource block quantity threshold configured for the terminal device.

Optionally, the second indication information may be a number that is of a parameter associated with the scheduled resource block quantity threshold and that is requested or reported by the terminal device.

Optionally, the second indication information may be a difference between a specified number and a number that is of a parameter associated with the scheduled resource block quantity threshold and that is requested or reported by the terminal device. The specified number may be a default configured number or a latest configured number of the parameter associated with the scheduled resource block quantity threshold of the terminal device.

Optionally, the second indication information may be a number of a parameter associated with the modified scheduled resource block quantity threshold.

Specifically, if the phase noise of the network device is relatively loud, the phase noise of the network device together with the number recommended by the terminal device or the capability reported by the terminal device is considered, to select a number corresponding to an optimal associated parameter.

Optionally, the second indication information may be a number that is of a table of the scheduled resource block quantity threshold and that is requested or reported by the terminal device.

Optionally, the second indication information may be a difference between a specified number and a number that is of a table of the scheduled resource block quantity threshold and that is requested or reported by the terminal device. The specified number may be a default configured number or a latest configured number of the scheduled resource block quantity threshold of the terminal device.

Optionally, the second indication information may be a number of a table of the modified scheduled resource block quantity threshold.

Specifically, if the phase noise of the network device is relatively loud, the phase noise of the network device together with the number recommended by the terminal device or the capability reported by the terminal device is considered, to select a number corresponding to an optimal associated table.

Optionally, the determining a pattern of a phase tracking reference signal includes: determining the pattern of the phase tracking reference signal based on the factor of the impact of the phase noise of the terminal device on the signal received by the terminal device.

Optionally, the factor of the impact may be a common phase error and/or inter-subcarrier interference.

Specifically, when the network device receives the factor of the impact of the phase noise of the terminal device on the signal received by the terminal device, if the phase noise of the network device is relatively ideal, the modulation and coding scheme threshold corresponding to the pattern of the phase tracking reference signal and/or the scheduled resource block quantity threshold corresponding to the pattern of the phase tracking reference signal may be determined based on the factor of the impact of the phase noise of the terminal device on the signal received by the terminal device. If the phase noise of the terminal device exerts relatively great impact on the signal received by the terminal device, the time domain density and/or the frequency domain density of the pattern of the phase tracking reference signal are/is increased, and the modulation and coding scheme threshold corresponding to the pattern of the phase tracking reference signal and/or the scheduled resource block quantity threshold corresponding to the pattern of the phase tracking reference signal are/is correspondingly increased.

For example, the factor of the impact is the common phase error. A greater common phase error indicates greater impact of the phase noise of the terminal device on the signal received by the terminal device. Therefore, the time domain density and/or the frequency domain density of the pattern of the phase tracking reference signal are/is increased.

Optionally, the determining the pattern of the phase tracking reference signal based on the factor of the impact of the phase noise of the terminal device on the signal received by the terminal device includes: determining the modulation and coding scheme threshold and/or a bandwidth threshold of the pattern of the phase tracking reference signal, and determining the pattern of the phase tracking reference signal, based on a comprehensive power spectral density of the phase noise of the terminal device and the network device and the factor of the impact of the phase noise of the terminal device on the signal received by the terminal device.

Specifically, when the network device receives the factor of the impact of the phase noise of the terminal device on the signal received by the terminal device, if the phase noise of the network device is relatively loud, the network device should determine the modulation and coding scheme threshold and/or the bandwidth threshold of the pattern of the phase tracking reference signal, and determine the pattern of the phase tracking reference signal, based on the comprehensive power spectral density of the phase noise of the terminal device and the network device and the factor of the impact of the phase noise of the terminal device on the signal received by the terminal device.

Optionally, the determining the pattern of the phase tracking reference signal based on a comprehensive power spectral density of the phase noise of the terminal device and the network device and the factor of the impact of the phase noise of the terminal device on the signal received by the terminal device includes: modifying the comprehensive power spectral density of the phase noise of the terminal device and the network device based on the factor of the impact of the phase noise of the terminal device on the signal received by the terminal device; determining the modulation and coding scheme threshold and/or the bandwidth threshold of the pattern of the phase tracking reference signal based on a modified comprehensive power spectral density of the phase noise of the terminal device and the network device; and determining the pattern of the phase tracking reference signal based on the scheduled modulation and coding scheme and/or bandwidth.

Optionally, before the determining the pattern of the phase tracking reference signal based on a comprehensive power spectral density of the phase noise of the terminal device and the network device and the factor of the impact of the phase noise of the terminal device on the signal received by the terminal device, the method further includes: estimating the comprehensive power spectral density of the phase noise of the terminal device and the network device based on a random access signal or an uplink reference signal sent by the terminal device.

Optionally, the network device sends third indication information to the terminal device. The third indication information is used to indicate the modulation and coding scheme threshold corresponding to the pattern of the phase tracking reference signal and/or the scheduled resource block quantity threshold corresponding to the pattern of the phase tracking reference signal.

Optionally, the network device sends fourth indication information to the terminal device. The fourth indication information is used to indicate an effective time of the modified modulation and coding scheme threshold corresponding to the phase tracking reference signal and/or the modified scheduled resource block quantity threshold corresponding to the pattern of the phase tracking reference signal that are/is sent by the network device to the terminal device. The effective time may be a time period after a time in which the terminal device receives the modified modulation and coding scheme threshold corresponding to the pattern of the phase tracking reference signal and/or the modified scheduled resource block quantity threshold corresponding to the pattern of the phase tracking reference signal, and the time may be in a unit of a slot, and/or a subframe, and/or a frame.

It should be understood that the effective time may be alternatively a time agreed upon by the network device and the terminal device.

Optionally, the network device may directly configure the number of the table of the modulation and coding scheme threshold corresponding to the pattern of the phase tracking reference signal and/or the number of the table of the scheduled resource block quantity threshold corresponding to the pattern of the phase tracking reference signal for the terminal device without considering the number of the table of the modulation and coding scheme threshold corresponding to the pattern of the phase tracking reference signal and/or the number of the table of the scheduled resource block quantity threshold corresponding to the pattern of the phase tracking reference signal, or the number of the parameter associated with the modulation and coding scheme threshold, or the number of the parameter associated with the scheduled resource block quantity threshold that are/is recommended or reported by the terminal device.

Specifically, when the terminal device does not report the number of the associated parameter, or the number of the table of the modulation and coding scheme threshold corresponding to the pattern of the phase tracking reference signal, and/or the number of the table of the scheduled resource block quantity threshold corresponding to the pattern of the phase tracking reference signal, for example, in an initialization phase, or when the capability reported by the terminal device is not accurate, or when the capability (for example, a phase noise model, or an algorithm of the receiver) reported by the terminal device exerts very little impact on selection of an associated table, the network device directly configures the number of the table of the modulation and coding scheme threshold corresponding to the pattern of the phase tracking reference signal and/or the number of the table of the scheduled resource block quantity threshold corresponding to the pattern of the phase tracking reference signal for the terminal device.

Optionally, the network device may directly configure the modulation and coding scheme threshold corresponding to the pattern of the phase tracking reference signal and/or the scheduled resource block quantity threshold corresponding to the pattern of the phase tracking reference signal for the terminal device, or directly configure the number of the table of the modulation and coding scheme threshold corresponding to the pattern of the phase tracking reference signal and/or the number of the table of the scheduled resource block quantity threshold corresponding to the pattern of the phase tracking reference signal.

Therefore, in the present application, the network device determines the pattern of the phase tracking reference signal based on the at least one of the modulation and coding scheme threshold that corresponds to the pattern of the phase tracking reference signal and requested by the terminal device, the scheduled resource block quantity threshold corresponding to the phase tracking reference signal requested by the terminal device, and the factor of the impact of the phase noise of the terminal device on the signal received by the terminal device that are sent by the terminal device and the at least one of the modulation and coding scheme currently scheduled by the network device for the terminal device and the bandwidth currently scheduled by the network device for the terminal device. In this way, patterns of phase tracking reference signals of different terminal devices in a case of different modulation and coding schemes and/or different scheduled bandwidth are flexibly configured, and therefore overheads of the phase tracking reference signals are reduced and spectral efficiency is improved while phase noise error compensation performance is ensured.

Figure 4:
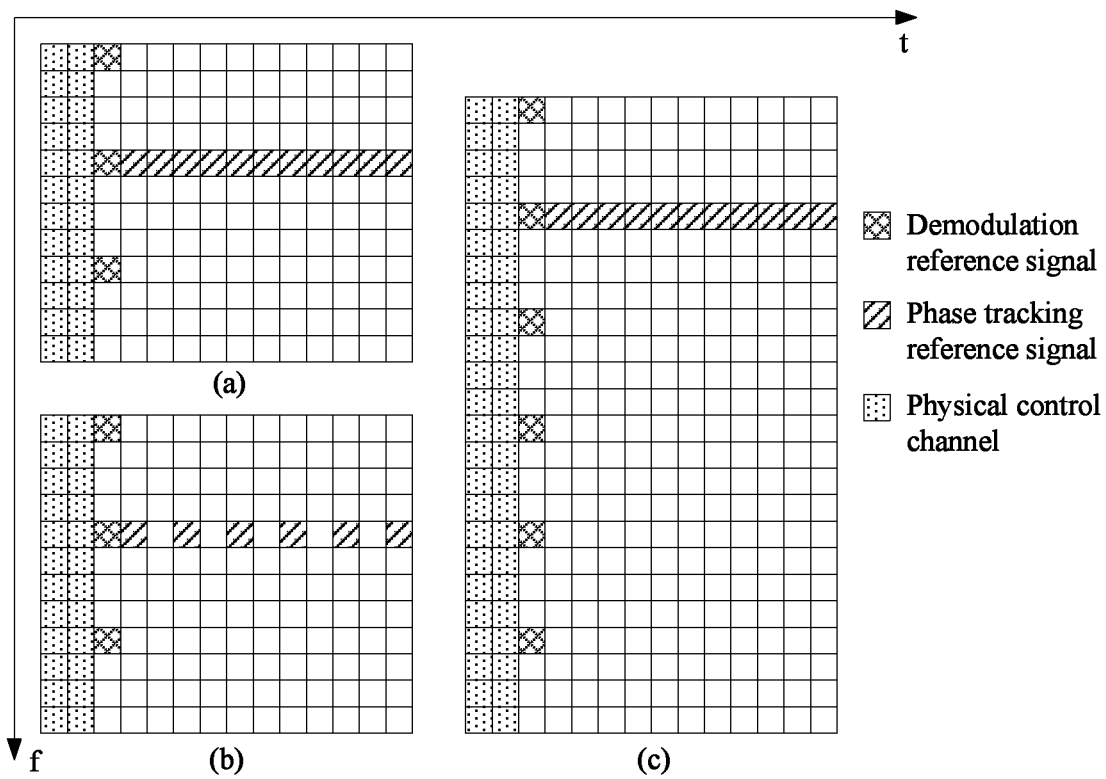
FIG. 4 is a schematic diagram of different patterns of PTRSs.

FIG. 4 is a schematic diagram of different patterns of PTRSs, and (a) in FIG. 4 is a schematic diagram of a current pattern of a PTRS. The network device determines the pattern of the phase tracking reference signal based on the at least one of the modulation and coding scheme threshold that corresponds to the pattern of the phase tracking reference signal and requested by the terminal device, the scheduled resource block quantity threshold that corresponds to the pattern of the phase tracking reference signal and requested by the terminal device, and the factor of the impact of the phase noise of the terminal device on the signal received by the terminal device that are sent by the terminal device and the at least one of the currently scheduled modulation and coding scheme and the currently scheduled bandwidth. The determined pattern of the PTRS may be (b) in FIG. 4 or (c) in FIG. 4. In FIG. (a), a PTRS has a frequency domain density of 1 (there is one PTRS on every 12 subcarriers) and a time domain density of 1. In FIG. (b), a PTRS has a frequency domain density of 1 (there is one PTRS on every 12 subcarriers) and a time domain density of ½. In FIG. (c), a PTRS has a frequency domain density of ½ (there is one PTRS on every 24 subcarriers) and a time domain density of 1. The network device flexibly adjusts the pattern of the phase tracking reference signal, so that a quantity of subcarriers occupied by the phase tracking reference signal is reduced.

At block 220, the network device sends the phase tracking reference signal to the terminal device based on the determined pattern of the phase tracking reference signal.

At block 230, the terminal device receives the phase tracking reference signal.

Therefore, in the present application, the network device determines the pattern of the phase tracking reference signal based on the at least one of the modulation and coding scheme threshold that corresponds to the pattern of the phase tracking reference signal and requested by the terminal device, the scheduled resource block quantity threshold that corresponds to the pattern of the phase tracking reference signal and requested by the terminal device, and the factor of the impact of the phase noise of the terminal device on the signal received by the terminal device and the at least one of the modulation and coding scheme currently scheduled by the network device for the terminal device and the bandwidth currently scheduled by the network device for the terminal device. In this way, the pattern of the phase tracking reference signal can be flexibly adjusted in a communication process, thereby reducing a quantity of subcarriers occupied by the phase tracking reference signal, and reducing resource overheads.

Figure 5:
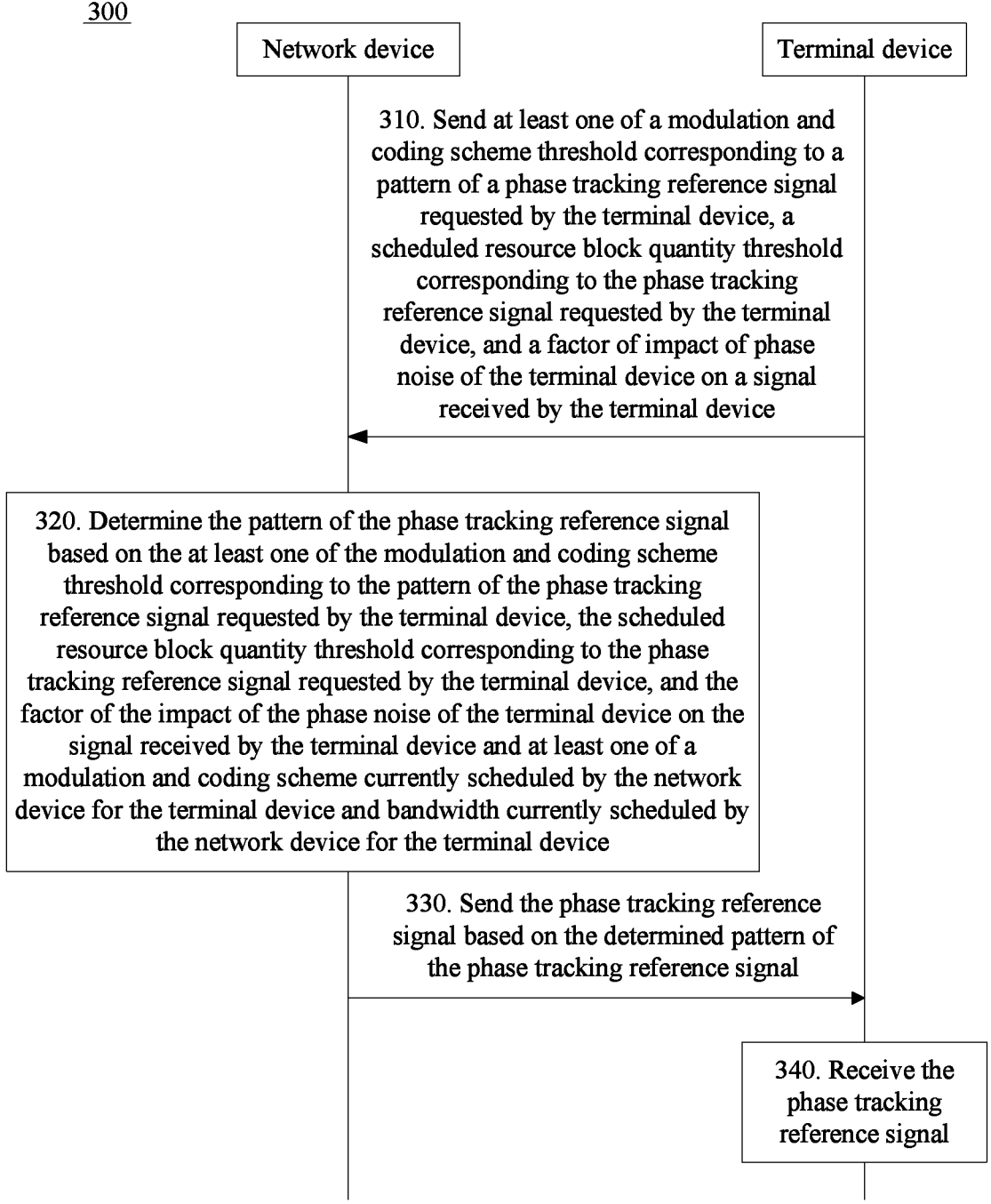
FIG. 5 is a schematic flowchart of a wireless communication method according to this application.

FIG. 5 is a schematic flowchart of a wireless communication method 300 according to this application. As shown in FIG. 5, the method 300 includes the following process.

At block 310, a terminal device sends, to a network device, at least one of a modulation and coding scheme threshold that corresponds to a pattern of a phase tracking reference signal and requested by the terminal device, a scheduled resource block quantity threshold corresponding to the phase tracking reference signal requested by the terminal device, and a factor of impact of phase noise of the terminal device on a signal received by the terminal device.

Optionally, the modulation and coding scheme threshold and the scheduled resource block quantity threshold each may be expressed as (M+N) bits, where M is used to represent a threshold, and N is used to represent a ranking of the threshold. When the threshold is the modulation and coding scheme threshold corresponding to the pattern of the phase tracking reference signal, bits required by M depend on a total quantity of modulation and coding scheme thresholds. In a current LTE system, modulation and coding scheme thresholds are 0 to 28, which are totally 29 bits. Therefore, M requires 5 bits. A value of N is determined based on a quantity of thresholds. If there are three specified MCS thresholds: $T_{MCS}^1$, $T_{MCS}^2$, and $T_{MCS}^3$, N requires 2 bits. If the modulation and coding scheme threshold sent by the terminal device is (01111+01), it indicates that a third threshold is 16. If all of the three thresholds need to be fed back, the modulation and coding scheme threshold may be alternatively expressed as (M+M+M). If only some of the thresholds need to be updated, (M+N) may be used to indicate a specific to-be-updated threshold and a ranking of the to-be-updated MCS threshold.

When the threshold is the scheduled resource block quantity threshold corresponding to the pattern of the phase tracking reference signal, bits required by M depend on a quantity of resource blocks RBs. In a current LTE system, a maximum quantity of scheduled resource blocks is usually 100. Therefore, M requires 7 bits. A value of N is determined based on a quantity of scheduled resource block quantity thresholds.

It should be understood that a value of M and the value of N may be adjusted based on an actual case.

It should be further understood that the modulation and coding scheme threshold and the scheduled resource block quantity threshold may be alternatively expressed in another form. This is not limited in the present application.

At block 320, the network device determines the pattern of the phase tracking reference signal based on the at least one of the modulation and coding scheme threshold that corresponds to the pattern of the phase tracking reference signal and requested by the terminal device, the scheduled resource block quantity threshold that corresponds to the pattern of the phase tracking reference signal and requested by the terminal device, and the factor of the impact of the phase noise of the terminal device on the signal received by the terminal device and at least one of a modulation and coding scheme currently scheduled by the network device for the terminal device and bandwidth scheduled by the network device for the terminal device.

At block 330, the network device sends the phase tracking reference signal to the terminal device based on the determined pattern of the phase tracking reference signal.

At block 340, the terminal device receives the phase tracking reference signal.

Blocks 320 to 340 in the method are the same as 210 to 230 in method 200. To avoid repetition, details are not repeated here.

Figure 6:
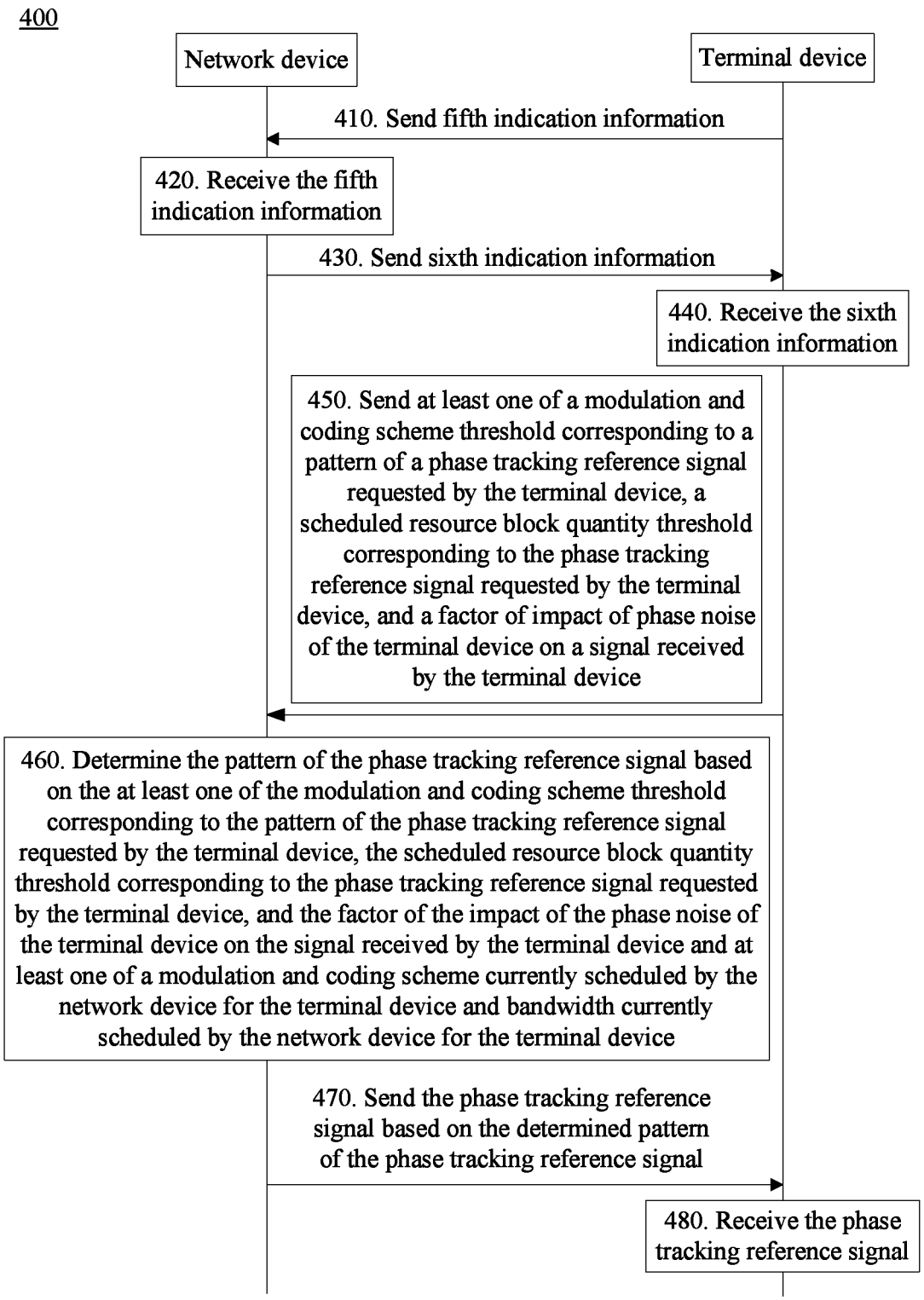
FIG. 6 is a schematic flowchart of a wireless communication method according to this application.

FIG. 6 is a schematic flowchart of a wireless communication method 400 according to this application. As shown in FIG. 6, the method 400 includes the following process.

At block 410, a terminal device sends fifth indication information to a network device, where the fifth indication information is used by the terminal device to request a first resource from the network device, and the first resource is used by the terminal device to send, to the network device, at least one of a modulation and coding scheme threshold that corresponds to a pattern of a phase tracking reference signal and requested by the terminal device, a scheduled resource block quantity threshold corresponding to the phase tracking reference signal requested by the terminal device, and a factor of impact of phase noise of the terminal device on a signal received by the terminal device.

Specifically, the phase noise is easily affected by an environment, for example, the phase noise intensifies due to a temperature rise. Therefore, when the terminal device detects that a threshold of a current pattern of a PTRS is improper, the terminal device sends fourth indication information to the network device, to request, from the network device, a resource to feed back the at least one of the modulation and coding scheme threshold that corresponds to the pattern of the phase tracking reference signal and requested by the terminal device, the scheduled resource block quantity threshold corresponding to the phase tracking reference signal requested by the terminal device, and the factor of the impact of the phase noise of the terminal device on the signal received by the terminal device.

Optionally, the terminal device may send, to the network device by using an RRC report, the at least one of the modulation and coding scheme threshold that corresponds to the pattern of the phase tracking reference signal and requested by the terminal device, the scheduled resource block quantity threshold that corresponds to the pattern of the phase tracking reference signal and requested by the terminal device, and the factor of the impact of the phase noise of the terminal device on the signal received by the terminal device.

At block 420, the network device receives the fifth indication information from the terminal device.

At block 430, the network device sends sixth indication information to the terminal device, where the sixth indication information is used to indicate the first resource.

Optionally, the sixth indication information may be further used to instruct the terminal device to feed back, to the network device, the at least one of the modulation and coding scheme threshold that corresponds to the pattern of the phase tracking reference signal and requested by the terminal device, the scheduled resource block quantity threshold corresponding to the phase tracking reference signal requested by the terminal device, and the factor of the impact of the phase noise of the terminal device on the signal received by the terminal device.

Specifically, when detecting that the threshold of the current pattern of the PTRS is improper, the network device may send indication information to the terminal device, to schedule the terminal device to feed back the at least one of the modulation and coding scheme threshold that corresponds to the pattern of the phase tracking reference signal and requested by the terminal device, the scheduled resource block quantity threshold corresponding to the phase tracking reference signal requested by the terminal device, and the factor of the impact of the phase noise of the terminal device on the signal received by the terminal device.

At block 440, the terminal device receives the sixth indication information from the network device.

At block 450, the terminal device sends, to the network device, the at least one of the modulation and coding scheme threshold that corresponds to the pattern of the phase tracking reference signal and requested by the terminal device, the scheduled resource block quantity threshold that corresponds to the pattern of the phase tracking reference signal and requested by the terminal device, and the factor of the impact of the phase noise of the terminal device on the signal received by the terminal device.

At block 460, the network device determines the pattern of the phase tracking reference signal based on the at least one of the modulation and coding scheme threshold that corresponds to the pattern of the phase tracking reference signal and requested by the terminal device, the scheduled resource block quantity threshold that corresponds to the pattern of the phase tracking reference signal and requested by the terminal device, and the factor of the impact of the phase noise of the terminal device on the signal received by the terminal device and at least one of a currently scheduled modulation and coding scheme and currently scheduled bandwidth.

At block 470, the network device sends the phase tracking reference signal to the terminal device based on the determined pattern of the phase tracking reference signal.

At block 480, the terminal device receives the phase tracking reference signal.

Blocks 460 to 480 in the method are the same as 210 to 230 in method 200. To avoid repetition, details are not repeated here.

Therefore, in the present application, the network device determines the pattern of the phase tracking reference signal based on the at least one of the modulation and coding scheme threshold that corresponds to the pattern of the phase tracking reference signal and requested by the terminal device, the scheduled resource block quantity threshold that corresponds to the pattern of the phase tracking reference signal and requested by the terminal device, and the factor of the impact of the phase noise of the terminal device on the signal received by the terminal device and the at least one of the modulation and coding scheme currently scheduled by the network device for the terminal device and the bandwidth currently scheduled by the network device for the terminal device. In this way, the pattern of the phase tracking reference signal can be flexibly adjusted in a communication process, thereby reducing a quantity of subcarriers occupied by the phase tracking reference signal, and reducing resource overheads.

Figure 7:
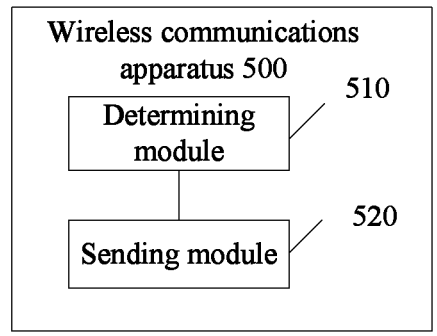
FIG. 7 is a schematic block diagram of a communications apparatus according to this application.

FIG. 7 is a schematic block diagram of a wireless communications apparatus 500 according to this application. As shown in FIG. 7, the wireless communications apparatus includes:

a determining module 510, configured to determine a pattern of a phase tracking reference signal based on at least one of a modulation and coding scheme threshold that corresponds to the pattern of the phase tracking reference signal and requested by a terminal device, a scheduled resource block quantity threshold corresponding to the phase tracking reference signal requested by the terminal device, and a factor of impact of phase noise of the terminal device on a signal received by the terminal device and at least one of a modulation and coding scheme currently scheduled by a network device for the terminal device and bandwidth currently scheduled by the network device for the terminal; and a sending module 520, configured to send the phase tracking reference signal to the terminal device based on the determined pattern of the phase tracking reference signal.

Optionally, the determining module 510 and the sending module 520 are configured to perform the operations in the wireless communication method 200, 300, or 400 in the present application. For brevity, details are not described herein again.

The wireless communications apparatus is the network device in the method embodiments, or may be a chip integrated into a network device.

Figure 8:
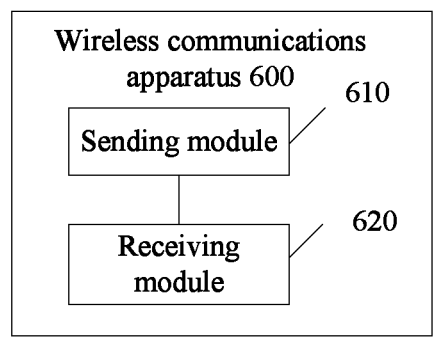
FIG. 8 is a schematic block diagram of a communications apparatus according to this application.

FIG. 8 is a schematic block diagram of a wireless communications apparatus 600 according to this application. As shown in FIG. 8, the wireless communications apparatus includes:

a sending module 610, configured to send, by a terminal device, first indication information to a network device, where the first indication information is used to indicate at least one of a modulation and coding scheme threshold that corresponds to a pattern of a phase tracking reference signal and requested by the terminal device, a scheduled resource block quantity threshold corresponding to the phase tracking reference signal requested by the terminal device, and a factor of impact of phase noise of the terminal device on a signal received by the terminal device; and a receiving module 620, configured to receive the phase tracking reference signal sent by the network device.

Optionally, the sending module 610 and the receiving module 620 are configured to perform the operations in the wireless communication method 200, 300, or 400 in the present application. For brevity, details are not described herein again.

The network device and the terminal device exactly correspond to the network device and the terminal device in the method embodiments, and corresponding modules perform corresponding processes. For details, refer to the corresponding method embodiments.

The wireless communications apparatus is the terminal device in the method embodiments, or may be a chip integrated into a terminal device.

Figure 9:
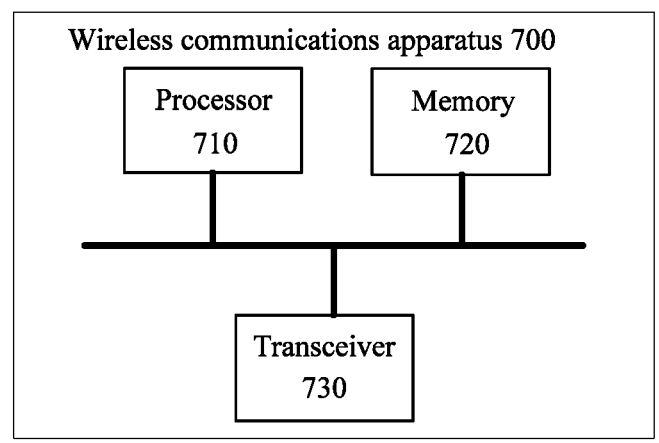
FIG. 9 is a schematic block diagram of a communications apparatus according to this application.

FIG. 9 is a schematic block diagram of a wireless communications apparatus 700 in another form according to this application. The communications apparatus 700 includes:

a memory 720, configured to store a program, where the program includes code;

a transceiver 730, configured to communicate with another device; and a processor 710, configured to execute the code in the program in the memory 720.

Optionally, when the code is executed, the processor 710 may implement the operations in the method 200, 300, or 400. For brevity, details are not described herein again. In this case, the communications apparatus 700 may be a network device or a terminal device. Driven by the processor 710, the transceiver 730 is configured to perform specific signal sending and receiving.

The communications apparatus 700 may be the foregoing network device or terminal device, or may be a chip integrated into a network device or a terminal device. The processor performs the operations of the determining module. The transceiver may include a transmitter and/or a receiver, and the transmitter and the receiver respectively perform the processes corresponding to the sending module and the receiving module.

The present application further provides the following embodiments. It should be noted that numbers of the following embodiments do not necessarily follow the order of the foregoing embodiments.

1. A wireless communication method, including:

determining, by a network device, a pattern of a phase tracking reference signal based on at least one of a modulation and coding scheme threshold that corresponds to the pattern of the phase tracking reference signal and requested by a terminal device, a scheduled resource block quantity threshold corresponding to the phase tracking reference signal requested by the terminal device, and a factor of impact of phase noise of the terminal device on a signal received by the terminal device that are sent by the terminal device and at least one of a modulation and coding scheme currently scheduled by the network device for the terminal device and bandwidth currently scheduled by the network device for the terminal device; and sending the phase tracking reference signal to the terminal device based on the determined pattern of the phase tracking reference signal.

2. The method according to embodiment 1, where the determining a pattern of a phase tracking reference signal includes:

determining a time domain density of the phase tracking reference signal based on the modulation and coding scheme threshold that corresponds to the pattern of the phase tracking reference signal and requested by the terminal device and the modulation and coding scheme currently scheduled by the network device for the terminal device.

3. The method according to embodiment 1 or 2, where the determining a time domain density of the phase tracking reference signal based on the modulation and coding scheme threshold corresponding to the pattern of the phase tracking reference signal and the modulation and coding scheme currently scheduled by the network device for the terminal device includes:

modifying, based on phase noise of the network device, the modulation and coding scheme threshold corresponding to the pattern of the phase tracking reference signal; and determining the time domain density of the phase tracking reference signal based on a modified modulation and coding scheme threshold corresponding to the pattern of the phase tracking reference signal and the modulation and coding scheme currently scheduled by the network device for the terminal device.

4. The method according to embodiment 3, where before the sending the phase tracking reference signal to the terminal device based on the pattern of the phase tracking reference signal, the method further includes:

when the network device modifies the modulation and coding scheme threshold corresponding to the pattern of the phase tracking reference signal, sending first indication information to the terminal device, where the first indication information is used to indicate the modified modulation and coding scheme threshold corresponding to the pattern of the phase tracking reference signal; or when the network device does not modify the modulation and coding scheme threshold corresponding to the pattern of the phase tracking reference signal, sending first indication information to the terminal device, where the first indication information is confirmation information.

5. The method according to any one of embodiments 1 to 4, where the determining a pattern of a phase tracking reference signal includes:

determining a frequency domain density of the phase tracking reference signal based on the scheduled resource block quantity threshold corresponding to the phase tracking reference signal and the bandwidth currently scheduled by the network device for the terminal device.

6. The method according to embodiment 5, where the determining a frequency domain density of the phase tracking reference signal based on the scheduled resource block quantity threshold corresponding to the phase tracking reference signal and the bandwidth currently scheduled by the network device for the terminal device includes:

modifying, based on the phase noise of the network device, the scheduled resource block quantity threshold corresponding to the phase tracking reference signal; and determining the frequency domain density of the phase tracking reference signal based on a modified scheduled resource block quantity threshold corresponding to the phase tracking reference signal and the bandwidth currently scheduled by the network device for the terminal device.

7. The method according to embodiment 6, where before the sending the phase tracking reference signal to the terminal device based on the pattern of the phase tracking reference signal, the method further includes:

when the network device modifies the scheduled resource block quantity threshold corresponding to the phase tracking reference signal, sending second indication information to the terminal device, where the second indication information is used to indicate the modified scheduled resource block quantity threshold corresponding to the phase tracking reference signal; or when the network device does not modify the scheduled resource block quantity threshold corresponding to the phase tracking reference signal, sending second indication information to the terminal device, where the second indication information is confirmation information.

8. The method according to embodiment 4 or 7, where the first indication information is radio resource control signaling, and the second indication information is radio resource control signaling.

9. A wireless communication method, including:

sending, by a terminal device, first indication information to a network device, where the first indication information is used to indicate at least one of a modulation and coding scheme threshold that corresponds to a pattern of a phase tracking reference signal and requested by the terminal device, a scheduled resource block quantity threshold corresponding to the phase tracking reference signal requested by the terminal device, and a factor of impact of phase noise of the terminal device on a signal received by the terminal device; and receiving the phase tracking reference signal sent by the network device.

10. The method according to embodiment 9, where the receiving the phase tracking reference signal sent by the network device includes:

receiving second indication information sent by the network device, where the second indication information is used to indicate a modified modulation and coding scheme threshold corresponding to the pattern of the phase tracking reference signal and/or a modified scheduled resource block quantity threshold corresponding to the phase tracking reference signal;

determining, based on the second indication information, the modified modulation and coding scheme threshold corresponding to the pattern of the phase tracking reference signal and/or the modified scheduled resource block quantity threshold corresponding to the phase tracking reference signal;

determining a time domain density and/or a frequency domain density of the phase tracking reference signal based on the modified modulation and coding scheme threshold corresponding to the pattern of the phase tracking reference signal and/or the modified scheduled resource block quantity threshold corresponding to the phase tracking reference signal, and a modulation and coding scheme scheduled by the network device for the terminal device and/or bandwidth currently scheduled by the network device for the terminal device;

determining a modified pattern of the phase tracking reference signal based on the time domain density and/or the frequency domain density of the phase tracking reference signal; and receiving, based on the pattern of the phase tracking reference signal, the phase tracking reference signal sent by the network device.

11. The method according to embodiment 10, where the second indication information is radio resource control signaling.

12. A network device, including:

a determining module, configured to determine a pattern of a phase tracking reference signal based on at least one of a modulation and coding scheme threshold that corresponds to the pattern of the phase tracking reference signal and requested by a terminal device, a scheduled resource block quantity threshold corresponding to the phase tracking reference signal requested by the terminal device, and a factor of impact of phase noise of the terminal device on a signal received by the terminal device that are sent by the terminal device and at least one of a modulation and coding scheme currently scheduled by the network device for the terminal device and bandwidth currently scheduled by the network device for the terminal device; and a sending module, configured to send the phase tracking reference signal to the terminal device based on the determined pattern of the phase tracking reference signal.

13. The network device according to embodiment 12, where the determining module is configured to:

determine a time domain density of the phase tracking reference signal based on the modulation and coding scheme threshold that corresponds to the pattern of the phase tracking reference signal and requested by the terminal device and the modulation and coding scheme currently scheduled by the network device for the terminal device.

14. The network device according to embodiment 12 or 13, where the determining module is configured to:

modify, based on phase noise of the network device, the modulation and coding scheme threshold corresponding to the pattern of the phase tracking reference signal; and determine the time domain density of the phase tracking reference signal based on a modified modulation and coding scheme threshold corresponding to the pattern of the phase tracking reference signal and the modulation and coding scheme currently scheduled by the network device for the terminal device.

15. The network device according to embodiment 14, where before sending the phase tracking reference signal to the terminal device based on the pattern of the phase tracking reference signal, the sending module is configured to:

when the network device modifies the modulation and coding scheme threshold corresponding to the pattern of the phase tracking reference signal, send first indication information to the terminal device, where the first indication information is used to indicate the modified modulation and coding scheme threshold corresponding to the pattern of the phase tracking reference signal; or when the network device does not modify the modulation and coding scheme threshold corresponding to the pattern of the phase tracking reference signal, send first indication information to the terminal device, where the first indication information is confirmation information.

16. The network device according to any one of embodiments 12 to 15, where the determining module is configured to:

determine a frequency domain density of the phase tracking reference signal based on the scheduled resource block quantity threshold corresponding to the phase tracking reference signal and the bandwidth currently scheduled by the network device for the terminal device.

17. The network device according to embodiment 16, where the determining module is configured to:

modify, based on the phase noise of the network device, the scheduled resource block quantity threshold corresponding to the phase tracking reference signal; and determine the frequency domain density of the phase tracking reference signal based on a modified scheduled resource block quantity threshold corresponding to the phase tracking reference signal and the bandwidth currently scheduled by the network device for the terminal device.

18. The network device according to embodiment 17, where before sending the phase tracking reference signal to the terminal device based on the pattern of the phase tracking reference signal, the sending module is configured to:

when the network device modifies the scheduled resource block quantity threshold corresponding to the phase tracking reference signal, send second indication information to the terminal device, where the second indication information is used to indicate the modified scheduled resource block quantity threshold corresponding to the phase tracking reference signal; or when the network device does not modify the scheduled resource block quantity threshold corresponding to the phase tracking reference signal, send second indication information to the terminal device, where the second indication information is confirmation information.

19. The network device according to embodiment 15 or 18, where the first indication information is radio resource control signaling, and the second indication information is radio resource control signaling.

20. A terminal device, including:

a sending module, configured to send, by the terminal device, first indication information to a network device, where the first indication information is used to indicate at least one of a modulation and coding scheme threshold that corresponds to a pattern of a phase tracking reference signal and requested by the terminal device, a scheduled resource block quantity threshold corresponding to the phase tracking reference signal requested by the terminal device, and a factor of impact of phase noise of the terminal device on a signal received by the terminal device; and a receiving module, configured to receive the phase tracking reference signal sent by the network device.

21. The terminal device according to embodiment 20, where before receiving the phase tracking reference signal sent by the network device, the receiving module is configured to:

receive second indication information sent by the network device, where the second indication information is used to indicate a modified modulation and coding scheme threshold corresponding to the pattern of the phase tracking reference signal and/or a modified scheduled resource block quantity threshold corresponding to the phase tracking reference signal;

determine, based on the second indication information, the modified modulation and coding scheme threshold corresponding to the pattern of the phase tracking reference signal and/or the modified scheduled resource block quantity threshold corresponding to the phase tracking reference signal;

determine a time domain density and/or a frequency domain density of the phase tracking reference signal based on the modified modulation and coding scheme threshold corresponding to the pattern of the phase tracking reference signal and/or the modified scheduled resource block quantity threshold corresponding to the phase tracking reference signal, and a modulation and coding scheme scheduled by the network device for the terminal device and/or bandwidth currently scheduled by the network device for the terminal device;

determine a modified pattern of the phase tracking reference signal based on the time domain density and/or the frequency domain density of the phase tracking reference signal; and receive, based on the pattern of the phase tracking reference signal, the phase tracking reference signal sent by the network device.

22. The terminal device according to embodiment 21, where the second indication information is radio resource control signaling.

A person of ordinary skill in the art may be aware that in combination with the examples described in the embodiments disclosed in this specification, the modules and the algorithmic steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, and it should not be considered that these implementations go beyond the scope of this application.

It may be clearly understood by a person skilled in the art that for ease and brevity of description, for a detailed working process of the foregoing system, apparatus, or module, refer to a corresponding process in one or more foregoing embodiments, and details may not be repeated again.

In the several embodiments provided in the present application, it should be understood that the disclosed system, apparatus, and method may be implemented in other manners. For example, the described apparatus embodiments are merely examples. For example, the module division is merely a logical function division. There may be other manners of division in actual implementation. For example, a plurality of modules or components may be combined or integrated into another system, or some features may be ignored or not performed. In addition, the displayed or discussed mutual couplings or direct couplings or communication connections may be implemented through some interfaces. The indirect couplings or communication connections between the apparatuses or modules may be implemented in an electronic form, a mechanical form, or another form.

The modules described as separate parts may or may not be physically separate, and parts displayed as modules may or may not be physically separate, that is, may be located in one position, or may be distributed in a plurality of network modules. Some or all of the modules may be selected based on an actual requirement to achieve the objectives of the solutions of the embodiments.

In addition, the function modules in the embodiments of this application may be integrated into one processing module, or each of the modules may exist alone physically, or two or more modules may be integrated into one module.

When the functions are implemented in a form of a software function module and sold or used as an independent product, the functions may be stored in a computer readable storage medium. Based on such an understanding, the technical solutions of this application essentially, or the part contributing to the prior art, or some of the technical solutions may be implemented in a form of a software product. The software product is stored in a storage medium, and includes instructions for instructing one computer device (which may be a personal computer, a server, a network device, or the like) to perform some or all of the steps in the methods described in the embodiments of this application. The foregoing storage medium includes any medium that can store program code, such as a Universal Serial Bus (USB) flash drive, a removable hard disk, a read-only memory (ROM), a random access memory (RAM), a magnetic disk, or an optical disc.

Some or all of the foregoing embodiments may be implemented by software, hardware, firmware, or any combination thereof. When software is used to implement the embodiments, some or all of the embodiments may be implemented in a form of a computer program product. The computer program product includes one or more computer instructions. When the computer instructions are loaded and executed on a computer, some or all of the procedure or functions according to this application are generated. The computer may be a general purpose computer, a dedicated computer, a computer network, or another programmable apparatus. The computer instructions may be stored in a computer readable storage medium, or may be transmitted from one computer readable storage medium to another computer readable storage medium. For example, the computer instructions may be transmitted from one website, computer, server, or data center to another website, computer, server, or data center in a wired (for example, a coaxial cable, an optical fiber, or a digital subscriber line) or wireless (for example, infrared, radio, or microwave) manner. The computer readable storage medium may be any usable medium accessible by a computer, or a data storage device, such as a server or a data center, including one or more usable media. The usable medium may be a magnetic medium (for example, a floppy disk, a hard disk, or a magnetic tape), an optical medium, a semiconductor medium (for example, a solid state disk, SSD), or the like.

The foregoing descriptions are merely exemplary implementations of this application, and are not intended to limit the protection scope of this application. Any variation or replacement readily figured out by a person skilled in the art within the technical scope disclosed in the present application may fall within the protection scope of this application.

What is claimed is:

1. A wireless communication method, comprising:
sending, by a terminal device, first indication information to a network device, wherein the first indication information indicates at least one of:
at least one first modulation and coding scheme threshold that is recommended by the terminal device; or
at least one first scheduled resource block quantity threshold that is recommended by the terminal device;
receiving, by the terminal device, second indication information from the network device, wherein the second indication information indicates at least one of:
at least one second modulation and coding scheme threshold; or
at least one second scheduled resource block quantity threshold;
determining, by the terminal device, a time domain density of a phase tracking reference signal based on the at least one second modulation and coding scheme threshold and a modulation and coding scheme scheduled by the network device for the terminal device, and/or determining, by the terminal device, a frequency domain density of the phase tracking reference signal based on the at least one second scheduled resource block quantity threshold and a bandwidth scheduled by the network device for the terminal device;
determining, by the terminal device, a pattern of the phase tracking reference signal based on the time domain density of the phase tracking reference signal and/or the frequency domain density of the phase tracking reference signal; and
receiving, by the terminal device, based on the pattern of the phase tracking reference signal, the phase tracking reference signal from the network device.

2. The method according to claim 1, wherein the first indication information comprises:
an index of a table of the at least one first modulation and coding scheme threshold; and/or
an index of a table of the at least one first scheduled resource block quantity threshold.

3. The method according to claim 1, wherein the first indication information comprises:
an index of a parameter associated with the at least one first modulation and coding scheme threshold; and/or
an index of a parameter associated with the at least one first scheduled resource block quantity threshold.

4. The method according to claim 1, wherein determining the time domain density of the phase tracking reference signal based on the at least one second modulation and coding scheme threshold and the modulation and coding scheme scheduled by the network device for the terminal device comprises:
determining the time domain density is 0 based on the modulation and coding scheme scheduled by the network device for the terminal device being greater than or equal to 0 and less than a first threshold ($T_{MCS}^1$) of the at least one second modulation and coding scheme threshold;
determining the time domain density is ¼ based on the modulation and coding scheme scheduled by the network device for the terminal device being greater than or equal to the first threshold ($T_{MCS}^1$) and less than a second threshold ($T_{MCS}^2$) of the at least one second modulation and coding scheme threshold;

determining the time domain density is ½ based on the modulation and coding scheme scheduled by the network device for the terminal device being greater than or equal to the second threshold ($T_{MCS}^2$) and less than a third threshold ($T_{MCS}^3$) of the at least one second modulation and coding scheme threshold; or determining the time domain density is 1 based on the modulation and coding scheme scheduled by the network device for the terminal device being greater than or equal to the third threshold ($T_{MCS}^3$).

5. The method according to claim 1, wherein determining the frequency domain density of the phase tracking reference signal based on the at least one second scheduled resource block quantity threshold and the bandwidth scheduled by the network device for the terminal device comprises:

determining the frequency domain density is 0 based on the bandwidth scheduled by the network device for the terminal device being greater than or equal to 0 and less than a first threshold ($T_{RB}^1$) of the at least one second scheduled resource block quantity threshold;

determining the frequency domain density is ½ subcarrier based on the bandwidth scheduled by the network device for the terminal device being greater than or equal to the first threshold ($T_{RB}^1$) and less than a second threshold ($T_{RB}^2$) of the at least one second scheduled resource block quantity threshold; or determining the frequency domain density is ¼ subcarrier based on the bandwidth scheduled by the network device for the terminal device being greater than or equal to the second threshold ($T_{RB}^2$).

6. A communications apparatus, comprising:

a transmitter, configured to send first indication information to a network device, wherein the first indication information indicates at least one of:
at least one first modulation and coding scheme threshold that is recommended by the communications apparatus; or
at least one first scheduled resource block quantity threshold that is recommended by the communications apparatus;

a receiver, configured to receive second indication information from the network device, wherein the second indication information indicates at least one of:
at least one second modulation and coding scheme threshold; or
at least one second scheduled resource block quantity threshold; and a processor, configured to:
determine a time domain density of a phase tracking reference signal based on the at least one second modulation and coding scheme threshold and a modulation and coding scheme scheduled by the network device for the communications apparatus, and/or determine a frequency domain density of the phase tracking reference signal based on the at least one second scheduled resource block quantity threshold and a bandwidth scheduled by the network device for the communications apparatus; and
determine a pattern of the phase tracking reference signal based on the time domain density of the phase tracking reference signal and/or the frequency domain density of the phase tracking reference signal;

wherein the receiver is further configured to receive, based on the pattern of the phase tracking reference signal, the phase tracking reference signal from the network device.

7. The communications apparatus according to claim 6, wherein the first indication information comprises:
an index of a table of the at least one first modulation and coding scheme threshold; and/or
an index of a table of the at least one first scheduled resource block quantity threshold.

8. The communications apparatus according to claim 6, wherein the first indication information comprises:
an index of a parameter associated with the at least one first modulation and coding scheme threshold; and/or
an index of a parameter associated with the at least one first scheduled resource block quantity threshold.

9. The communications apparatus according to claim 6, wherein the processor is configured to determine the time domain density of the phase tracking reference signal based on the at least one second modulation and coding scheme threshold and the modulation and coding scheme scheduled by the network device for the communications apparatus by:

determining the time domain density is 0 based on the modulation and coding scheme scheduled by the network device for the communications apparatus being greater than or equal to 0 and less than a first threshold ($T_{MCS}^1$) of the at least one second modulation and coding scheme threshold;

determining the time domain density is ¼ based on the modulation and coding scheme scheduled by the network device for the communications apparatus being greater than or equal to the first threshold ($T_{MCS}^1$) and less than a second threshold ($T_{MCS}^2$) of the at least one second modulation and coding scheme threshold;

determining the time domain density is ½ based on the modulation and coding scheme scheduled by the network device for the communications apparatus being greater than or equal to the second threshold ($T_{MCS}^2$) and less than a third threshold ($T_{MCS}^2$) of the at least one second modulation and coding scheme threshold; or determining the time domain density is 1 based on the modulation and coding scheme scheduled by the network device for the communications apparatus being greater or equal to the third threshold ($T_{MCS}^3$).

10. The communications apparatus according to claim 6, wherein the processor is configured to determine the frequency domain density of the phase tracking reference signal based on the at least one second scheduled resource block quantity threshold and the bandwidth scheduled by the network device for the communications apparatus by:

determining the frequency domain density is 0 based on the bandwidth scheduled by the network device for the communications apparatus being greater than or equal to 0 and less than a first threshold ($T_{RB}^1$) of the at least one second scheduled resource block quantity threshold;

determining the frequency domain density is ½ subcarrier based on the bandwidth scheduled by the network device for the communications apparatus being greater than or equal to the first threshold ($T_{RB}^1$) and less than a second threshold ($T_{RB}^2$) of the at least one second scheduled resource block quantity threshold; or determining the frequency domain density is ¼ subcarrier based on the bandwidth scheduled by the network device for the communications apparatus being greater than or equal to the second threshold ($T_{RB}^2$).

11. A wireless communication method, comprising:
receiving, by a network device, first indication information from a terminal device, wherein the first indication information indicates at least one of:
  at least one first modulation and coding scheme threshold that is recommended by the terminal device, or
  at least one first scheduled resource block quantity threshold that is recommended by the terminal device;
sending, by the network device, second indication information to the terminal device, wherein the second indication information indicates at least one of:
  at least one second modulation and coding scheme threshold; or
  at least one second scheduled resource block quantity threshold;
determining, by the network device, a time domain density of a phase tracking reference signal based on the at least one second modulation and coding scheme threshold and a modulation and coding scheme scheduled by the network device for the terminal device, and/or determining, by the network device, a frequency domain density of the phase tracking reference signal based on the at least one second scheduled resource block quantity threshold and a bandwidth scheduled by the network device for the terminal device;
determining, by the network device, a pattern of the phase tracking reference signal based on the time domain density of the phase tracking reference signal and/or the frequency domain density of the phase tracking reference signal; and
sending, by the network device, based on the pattern of the phase tracking reference signal, the phase tracking reference signal to the terminal device.

12. The method according to claim 11, wherein the first indication information comprises:
an index of a table of the at least one first modulation and coding scheme threshold; and/or
an index of a table of the at least one first scheduled resource block quantity threshold.

13. The method according to claim 11, wherein the first indication information comprises:
an index of a parameter associated with the at least one first modulation and coding scheme threshold; and/or
an index of a parameter associated with the at least one first scheduled resource block quantity threshold.

14. The method according to claim 11, wherein determining the time domain density of the phase tracking reference signal based on the at least one second modulation and coding scheme threshold and the modulation and coding scheme scheduled by the network device for the terminal device comprises:
determining the time domain density is 0 based on the modulation and coding scheme scheduled by the network device for the terminal device being greater than or equal to 0 and less than a first threshold ($T_{MCS}^1$) of the at least one second modulation and coding scheme threshold;
determining the time domain density is ¼ based on the modulation and coding scheme scheduled by the network device for the terminal device being greater than or equal to the first threshold ($T_{MCS}^1$) and less than a second threshold ($T_{MCS}^2$) of the at least one second modulation and coding scheme threshold;
determining the time domain density is ½ based on the modulation and coding scheme scheduled by the network device for the terminal device being greater than or equal to the second threshold ($T_{MCS}^2$) and less than a third threshold ($T_{MCS}^3$) of the at least one second modulation and coding scheme threshold; or
determining the time domain density is 1 based on the modulation and coding scheme scheduled by the network device for the terminal device being greater than or equal to the third threshold ($T_{MCS}^3$).

15. The method according to claim 11, wherein determining the frequency domain density of the phase tracking reference signal based on the at least one second scheduled resource block quantity threshold and the bandwidth scheduled by the network device for the terminal device comprises:
determining the frequency domain density is 0 based on the bandwidth scheduled by the network device for the terminal device being greater than or equal to 0 and less than a first threshold ($T_{RB}^1$) of the at least one second scheduled resource block quantity threshold;
determining the frequency domain density is ½ subcarrier based on the bandwidth scheduled by the network device for the terminal device being greater than or equal to the first threshold ($T_{RB}^1$) and less than a second threshold ($T_{RB}^2$) of the at least one second scheduled resource block quantity threshold; or
determining the frequency domain density is ¼ subcarrier based on the bandwidth scheduled by the network device for the terminal device being greater than or equal to the second threshold ($T_{RB}^2$).

16. A communications device, comprising:
a receiver, configured to receive first indication information from a terminal device, wherein the first indication information indicates at least one of:
  at least one first modulation and coding scheme threshold that is recommended by the terminal device, or
  at least one first scheduled resource block quantity threshold that is recommended by the terminal device;
a transmitter, configured to send second indication information to the terminal device, wherein the second indication information indicates at least one of:
  at least one second modulation and coding scheme threshold, or
  at least one second scheduled resource block quantity threshold; and
a processor, configured to:
  determine a time domain density of a phase tracking reference signal based on the at least one second modulation and coding scheme threshold and a modulation and coding scheme scheduled by the communications device for the terminal device, and/or determine a frequency domain density of the phase tracking reference signal based on the at least one second scheduled resource block quantity threshold and a bandwidth scheduled by the communications device for the terminal device; and
  determine a pattern of the phase tracking reference signal based on the time domain density of the phase tracking reference signal and/or the frequency domain density of the phase tracking reference signal;

wherein the transmitter is further configured to send, based on the pattern of the phase tracking reference signal, the phase tracking reference signal to the terminal device.

17. The communications device according to claim 16, wherein the first indication information comprises:
   an index of a table of the at least one first modulation and coding scheme threshold; and/or
   an index of a table of the at least one first scheduled resource block quantity threshold.

18. The communications device according to claim 16, wherein the first indication information comprises:
   an index of a parameter associated with the at least one first modulation and coding scheme threshold; and/or
   an index of a parameter associated with the at least one first scheduled resource block quantity threshold.

19. The communications device according to claim 16, wherein the processor is configured to determine the time domain density of the phase tracking reference signal based on the at least one second modulation and coding scheme threshold and the modulation and coding scheme scheduled by the communications device for the terminal device by:
   determining the time domain density is 0 based on the modulation and coding scheme scheduled by the communications device for the terminal device being greater than or equal to 0 and less than a first threshold ($T_{MCS}^1$) of the at least one second modulation and coding scheme threshold;
   determining the time domain density is ¼ based on the modulation and coding scheme scheduled by the communications device for the terminal device being greater than or equal to the first threshold ($T_{MCS}^1$) and less than a second threshold ($T_{MCS}^2$) of the at least one second modulation and coding scheme threshold;
   determining the time domain density is ½ based on the modulation and coding scheme scheduled by the communications device for the terminal device being greater than or equal to the second threshold ($T_{MCS}^2$) and less than a third threshold ($T_{MCS}^3$) of the at least one second modulation and coding scheme threshold; or
   determining the time domain density is 1 based on the modulation and coding scheme scheduled by the communications device for the terminal device being greater than or equal to the third threshold ($T_{MCS}^3$).

20. The communications device according to claim 16, wherein the processor is configured to determine the frequency domain density of the phase tracking reference signal based on the at least one second scheduled resource block quantity threshold and the bandwidth scheduled by the communications device for the terminal device by:
   determining the frequency domain density is 0 based on the bandwidth scheduled by the communications device for the terminal device being greater than or equal to 0 and less than a first threshold ($T_{RB}^1$) of the at least one second scheduled resource block quantity threshold;
   determining the frequency domain density is ½ subcarrier based on the bandwidth scheduled by the communications device for the terminal device being greater than or equal to the first threshold ($T_{RB}^1$) and less than a second threshold ($T_{RB}^2$) of the at least one second scheduled resource block quantity threshold; or
   determining the frequency domain density is ¼ subcarrier based on the bandwidth scheduled by the communications device for the terminal device being greater than or equal to the second threshold ($T_{RB}^2$).

* * * * *